US007662312B2

(12) United States Patent
Sinko et al.

(10) Patent No.: US 7,662,312 B2
(45) Date of Patent: Feb. 16, 2010

(54) PIGMENT GRADE CORROSION INHIBITOR HOST-GUEST COMPOSITIONS AND PROCEDURE

(75) Inventors: John Sinko, Mequon, WI (US); Martin W. Kendig, Thousand Oaks, CA (US)

(73) Assignee: Wayne Pigment Corp., Milwaukee, WI (US)

(*) Notice: Subject to any disclaimer, the term of this patent is extended or adjusted under 35 U.S.C. 154(b) by 63 days.

(21) Appl. No.: 11/982,011

(22) Filed: Nov. 1, 2007

(65) Prior Publication Data
US 2008/0258114 A1   Oct. 23, 2008

Related U.S. Application Data

(63) Continuation of application No. 10/877,946, filed on Jun. 25, 2004, which is a continuation-in-part of application No. 10/784,541, filed on Feb. 23, 2004, which is a continuation-in-part of application No. 10/138,794, filed on May 3, 2002, now abandoned.

(60) Provisional application No. 60/288,895, filed on May 4, 2001, provisional application No. 60/483,436, filed on Jun. 27, 2003.

(51) Int. Cl.
  C09K 3/00     (2006.01)
  C23F 11/00    (2006.01)
  B05D 3/02     (2006.01)

(52) U.S. Cl. .................. 252/394; 252/387; 252/395; 427/372.2; 427/435; 427/443.2; 106/14.05; 106/14.12

(58) Field of Classification Search .......... 252/394, 252/387, 395; 427/372.2, 435, 443.2
See application file for complete search history.

(56) References Cited

U.S. PATENT DOCUMENTS 3,980,573 A    9/1976   Okorodudu (Continued)

FOREIGN PATENT DOCUMENTS

EP    0045827 B1    11/1983

(Continued)

OTHER PUBLICATIONS

"Challenges of Chromate Inhibitor Pigments Replacement in Organic Coatings" John Sinko May 1, 2001, 2001 Elsevier Science B.V., pp. 267-282.

(Continued)

*Primary Examiner*—Jerry Lorengo
*Assistant Examiner*—Pegah Parvini
(74) *Attorney, Agent, or Firm*—Ryan Kromholz & Manion, S.C.

(57) ABSTRACT

A pigment grade corrosion inhibitor and a method of applying the inhibitor is disclosed. The inhibitor is comprised of a host species comprised of an inorganic compound having a layered structure and a guest species comprised an anionic species of a weak acid. The host species is preferably a double hydroxide having a structure of: $[M(II)_{1-x} M(III)_x (OH^-)_2]$ $[A^{n-}{}_{x/n} \cdot y\, H_2O]$, where M(II) is a divalent metal cationic species, M(III) is a trivalent metal cationic species, and $A^{n-}$ is an anionic species, preferably with the species present in a range of: $0.2 \leq M(III)/(M(II)+M(III)) \leq 0.4$. The guest species include: various phosphoric acids and derivatives thereof; boric acid; cyanamidic acid; nitrous acid; derivatives of thio- and dithiocarbonic acid; thio-organic compounds functionalized with at least one —SH group of acidic character, including: 2,5-dimercapto-1,3,4-thiadiazole (DMTD), 2,4-dimercapto-s-triazolo-[4,3-b]-1,3-4 thiadiazole, trithiocyanuric acid (TMT), and dithiocyanuric acid.

6 Claims, 9 Drawing Sheets

IR spectrum of non-ignited Htlc and of the Mg-Al-O mixed oxide precursor, relevant to Comparative Example 1.

U.S. PATENT DOCUMENTS

| | | | |
|---|---|---|---|
| 4,306,988 A | 12/1981 | Rothgery | |
| 4,329,381 A | 5/1982 | Eschwey et al. | |
| 4,349,458 A | 9/1982 | Rothgery | |
| 4,623,474 A | 11/1986 | Holstedt et al. | |
| 4,707,405 A | 11/1987 | Evans et al. | |
| 5,008,153 A | 4/1991 | Hayes | |
| 5,035,720 A | 7/1991 | Weers | |
| 5,110,494 A | 5/1992 | Beck | |
| 5,171,861 A | 12/1992 | Ernhoffer et al. | |
| 5,176,894 A | 1/1993 | Sinko | |
| 5,314,532 A | 5/1994 | Hughes et al. | |
| 5,342,548 A * | 8/1994 | Yorke et al. | 252/391 |
| 5,378,446 A | 1/1995 | Sinko | |
| 5,487,779 A | 1/1996 | Sinko | |
| 5,558,706 A | 9/1996 | Sinko | |
| 5,595,747 A | 1/1997 | Kuroda et al. | |
| RE35,576 E * | 7/1997 | Buchheit et al. | 427/372.2 |
| 5,846,342 A | 12/1998 | Aoyama et al. | |
| 5,948,147 A | 9/1999 | Sinko | |
| 6,139,610 A | 10/2000 | Sinko | |
| 6,579,472 B2 | 6/2003 | Chung et al. | |
| 2002/0022689 A1 | 2/2002 | Menon et al. | |
| 2002/0032329 A1 * | 3/2002 | Babiak et al. | 544/351 |
| 2002/0197468 A1 * | 12/2002 | Sinko | 428/336 |
| 2002/0198290 A1 * | 12/2002 | Morishita et al. | 523/400 |
| 2003/0019391 A1 | 1/2003 | Kendig | |
| 2003/0024432 A1 | 2/2003 | Chung et al. | |

FOREIGN PATENT DOCUMENTS

| | | |
|---|---|---|
| JP | 2001-335955 A | 7/2001 |
| JP | 2001-335964 A | 7/2001 |
| JP | 2001-335965 A | 7/2001 |
| WO | WO 97/25274 A1 | 7/1997 |
| WO | WO 99/18044 A1 | 4/1999 |
| WO | WO 02/092880 A1 | 11/2002 |

OTHER PUBLICATIONS

Periodical: "Application of Corrosion Inhibitors in Water-Borne Coatings", pp. 18-23. Eurocorr '91. vol. 1; Budapest, Hungary; Oct. 1991; GTE Rendezveny lroda gondozasaban.

"Ellipsometric Studies of Chelating Inhibitor Effects on the Cathodic Delamination of an Organic Coating on Iron" Joseph J Ritter, National Bureau of Standards, vol. 56, No. 714, Jul. 1984, pp. 55-60.

* cited by examiner

Fig. 1. IR spectrum of non-ignited Htlc and of the Mg-Al-O mixed oxide precursor, relevant to Comparative Example 1.

Fig. 2. IR spectrum of the Mg-Al-OH-DMTD derivative according to Example 4.

Fig. 3. IR spectrum of the Mg-Al-OH-TTC derivative according to Example 8.

Fig. 4. IR spectrum of the Mg-Al-OH-MBT derivative according to Example 9.

Fig. 5. IR spectrum of the Mg-Al-OH-NCN²⁻ derivative according to Example 11.

FIG. 6. IR Spectrum of Di-cyclohexylamine-Trithiocyanuric Acid, 1:1 Salt, according to Referential Example 5

FIG 8. IR Spectrum of Trithiocyanuric Acid + Sr-doped Amorphous Silica pigment grade mixture according to Referential Example 3

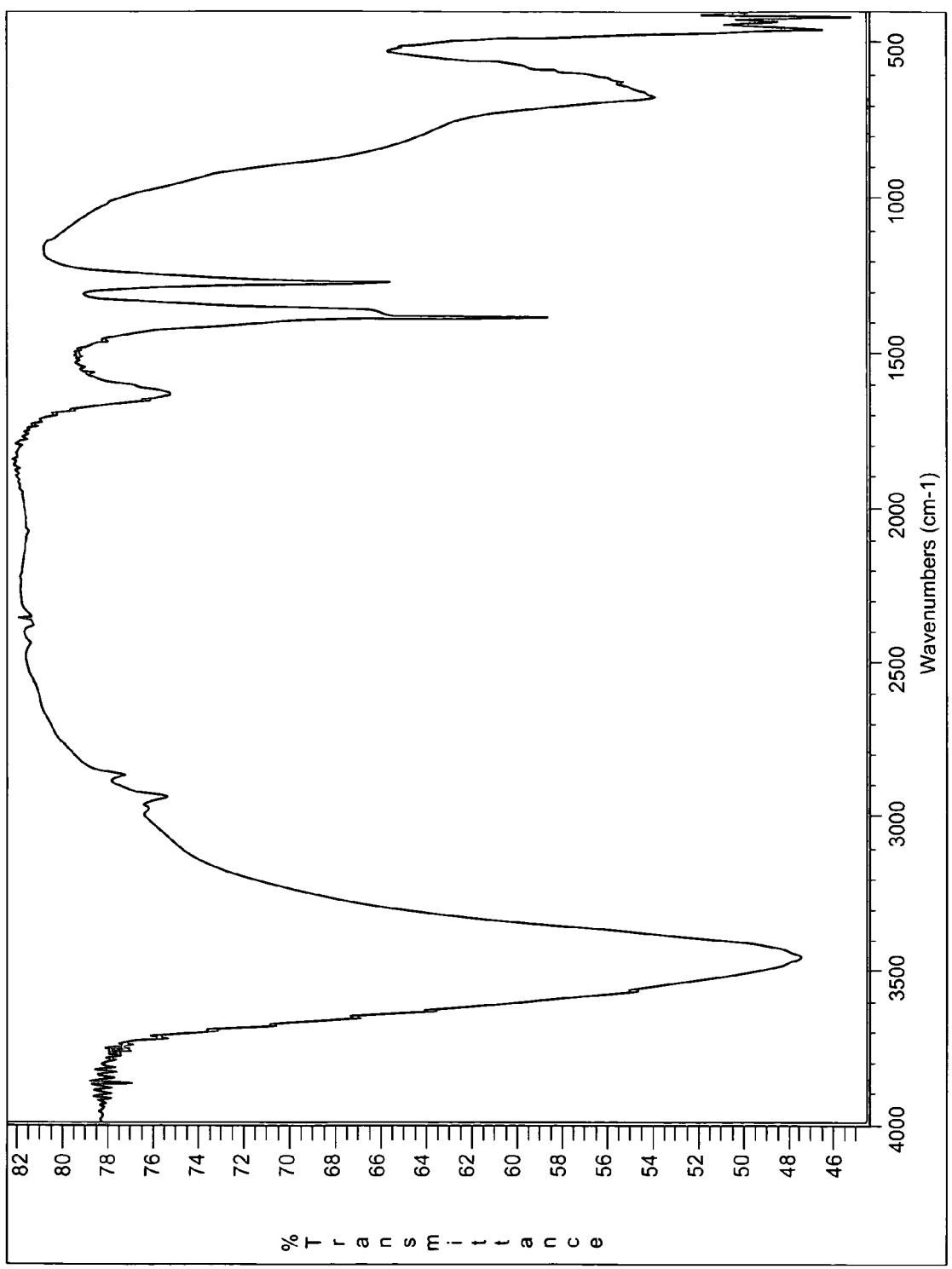
Fig. 9. IR Spectrum of Htlc-NO2 synthesized according to Example 2.

PIGMENT GRADE CORROSION INHIBITOR HOST-GUEST COMPOSITIONS AND PROCEDURE

RELATED APPLICATIONS

This application is a continuation of patent application Ser. No. 10/877,946, filed 25 Jun. 2004, which is a continuation-in-part of patent application Ser. No. 10,784,541, filed on 23 Feb. 2004, which is a continuation-in-part of patent application Ser. No. 10/138,794, filed 3 May 2002, abandoned, which claims the benefit of Provisional Patent Application Ser. No. 60/288,895, filed 4 May 2001, and also claims the benefit of Provisional Patent Application Ser. No. 60/483,436 filed 27 Jun. 2003.

BACKGROUND OF THE INVENTION

Protection of metals and metal alloys against atmospheric corrosion constitutes a challenge of significant economic importance. There are two distinct corrosion control technologies commonly applied to protect against atmospheric corrosion: conversion coatings and organic coatings. The present invention relates to novel pigment grade host-guest compositions that are suitable for applications in organic coatings and organic primers intended for metal protection. The guest species of the compositions possess corrosion inhibition ability, and inhibition is achieved when the guest species are spontaneously released from the host matrix into aqueous environments in contact with corroding metal substrates.

Pigment grade corrosion inhibitors are generally employed as functional constituents of organic coatings or primers, with organic primers considered the most versatile control technology of metal corrosion under atmospheric conditions.

Currently, when the barrier function of the primer is "lost", corrosion inhibiting pigments provide the only known protective mechanism at damage sites of metal supported organic coatings. This protective mechanism implies leaching of inhibitor species from coatings while in contact with an aqueous phase and transportation of the inhibitor species by diffusion to specific damage sites of coatings where corrosion occurs. It will be apparent that pigmented primers under atmospheric corrosion conditions function like reservoirs of corrosion inhibitor species, with the reservoirs opening during aqueous events. Likewise, the effectiveness in corrosion inhibition of the primer reservoir depends on the chemical identity, solubility and load (referred to as Pigment Volume Concentration or PVC) of the inhibitor species.

As is well known, pigment grade corrosion inhibitors used in organic primers must contain anionic species with effective inhibitor activity and must be characterized by limited, but effective, solubility in water. For these reasons, $CrO_4^{--}$ is the corrosion inhibitor species preferred in both conversion coating and high performance organic primer technologies applied on metals for protection against atmospheric corrosion.

It is also well known that corrosion inhibitor pigments are comprised of selected inorganic salts, specifically inorganic salts of weak oxi-acids, or electrolytes, with limited solubility in water. It has been noted, that while the anionic constituents comprise the active corrosion inhibitor species of pigments, cationic constituents determine essential properties of the latter, such as solubility, hydrolysis pH, and specific gravity. Such is evident with the chromate series of inhibitor pigments (where $CrO_4^{--}$ is the active inhibitor), which includes Ca, Ba, Sr and Zn-chromates. Current research and development-activities in this field are focused on development of effective pigment grade corrosion inhibitors and, specifically, on the development of effective, non-toxic replacements for chromates in high performance organic coatings, which are used as coil and aircraft primers.

Aircraft primers and coil primers are the typical high performance organic coatings that are applied for protection of metals against atmospheric corrosion, most notably for aluminum protection, and especially in the aircraft manufacturing industry. $SrCrO_4$ is the corrosion inhibitor pigment of choice for aircraft and coil primers, and is the standard in the industry. Due to environmental concerns, finding a replacement for chromates in organic coatings constitutes a main objective of contemporary research in this field. Likewise, efforts have been made to expand the application of organic corrosion inhibitors for use in pigment grade compositions for all metals and not just specifically aluminum.

It is generally known, that the number of inorganic anionic corrosion inhibitor species suitable for pigment synthesis and available for chromate replacement is limited essentially to a few, and specifically to $MoO_4^{--}$, $PO_4^{---}$, $BO_2^-$, $SiO_4^{--}$ and $NCN^{--}$. As a consequence, all commercial non-chromate corrosion inhibitor pigments are molybdates, phosphates, borates, silicates or cyanamides, or combinations of these compounds. It should be noted that, $NO_2^-$, a very effective inhibitor, is not available in pigment grades, since all nitrites are too soluble for coating applications. Likewise, it should be noted that some anionic species, such as $Cl^-$, $SO_4^{--}$, $SO_3^{--}$ and most notably, $NO_3^-$ to some extent, are known promoters of metal corrosion, rather than inhibitors.

In comparison to $CrO_4^{--}$, inherent limitations of their corrosion preventing mechanism render these above-specified species less effective inhibitors of corrosion, in general. Consequently, it appears that inorganic chemistry is unable to produce an effective, non-toxic alternative of $CrO_4^{--}$. In contrast, a large arsenal of organic corrosion inhibitor is known and applied in various corrosion control technologies. Mechanistic shortcomings, excessive solubility in water and/or volatility of most of the known organic inhibitors appear to be the physical properties inconsistent with applications in organic coatings. Thus, requirements for pigment grade inhibitors, delimited by the above suggested reservoir model of pigmented organic coatings, include, among other requirements, a solid consistency, non-volatility, a limited, though effective, solubility in water, high load of the inhibitor species, an efficient inhibitor mechanism, and further having a compatible environmental profile.

An area of interest in this regard has been the development of hydrotalcite based products for corrosion inhibition. As discussed later in more details, hydrotalcite belongs to the family of mixed hydroxides of layered structure, which possess anion-exchange capability and are known to form a considerable number of derivatives containing diverse guest anions.

Hydrotalcite has found various applications, such as $Cl^-$ scavenger in plastics and as an acid neutralizer in various systems.

Specifically referring to applications in corrosion inhibition, for instance, Buchheit et al., U.S. Re. No. 35,576, (U.S. Pat. No. 5,266,356) describes the in situ and spontaneous formation of a hydrotalcite-like coatings on aluminum alloys for their corrosion protection. However, the patent is limited in that it does not mention use of inorganic or organic inhibitor anionic species in this context. Kuroda et al., U.S. Pat. No. 5,595,747, demonstrates the effectiveness of hydrotalcite, through its ion exchange property, to hold functional organic anions intended for various applications by slow release, such as releasing an active pesticide. However, Kuroda only references biocidally active compounds and does not suggest use with, or of, corrosion inhibitor compounds.

Miyata et al., U.S. Pat. No. 4,761,188, claims a hydrotalcite based filiform corrosion inhibiting composition containing a number of inorganic and organic anionic species, such as I$^-$, HCO$_3^{2-}$, CO$_3^{2-}$, CrO$_4^{2-}$, ferrocyanide anion, and, respectively, salicylate and oxalate anion. It will be apparent however, that except for CrO$_4^{2-}$, and I$^-$, which is known to rather promote corrosion, the rest of the inorganic and organic anionic species claimed within the patent are not credited with and generally are not recognized for corrosion inhibitor activity, specifically in coating applications. Consequently, these hydrotalcite derivatives cannot be considered pigment grade corrosion inhibitors.

As for organic corrosion inhibitors employed in organic coatings, it should be noted that Sinko (U.S. Pat. No. 6,139,610) discloses the application of selected organic compounds in the form of organic-inorganic hybrid corrosion inhibitor pigments intended for chromate replacement in organic coatings. However, Sinko does not mention the applicability of hydrotalcite specifically, for synthesizing pigment grade organic/inorganic 'hybrid' inhibitors. It can be concluded that; as of to date, the application of organic corrosion inhibitors in organic coatings has not reached commercial significance.

SUMMARY OF THE INVENTION

It has been discovered pursuant to the present invention that selected organic compounds in a host-guest composition may function as pigment grade corrosion inhibitor. Specifically, the host matrix is inorganic, it possesses a layered structure and displays anion exchange capability. Such matrices include double hydroxides with layered structure of $$[M(II)_{1-x}M(III)_x(OH^-)_2][A^{n-}{}_{x/n}\cdot yH_2O]$$

generic composition, where M(II) is generally a divalent metal cationic species or, in some cases Li (I), M (III) is a tri-valent metal cationic species, and A$^{n-}$ represent diverse anionic species. In quantitative terms, a ratio of:

has been suggested as feasible. It will be apparent that the 2(1−x)+3X total number of cationic valences in the matrix are balanced by the 2+n(x/n) number of anionic valences of OH$^-$ and A$^{n-}$, where the former is the quantitatively dominant species.

The load of A$^{n-}$ anionic guest species is variable between the limits, as follows:

$$1/n \leq A^{n-}/M(III) \leq 1$$

Notably, this concept is of practical interest in the context of the present invention, and it suggests that the OH$^-$ and A$^{n-}$ species compete for the limited number of cationic sites available for guest anions in the matrix. It also suggests that under specific synthesis conditions, the load of A$^{n-}$ in the matrix can be maximized.

Structurally, in these double hydroxides, the OH$^-$ and A$^{n-}$ anionic species, as well as H$_2$O, reside in the space between parallel layers formed by the M(II) and M(III) cationic species. While the layered structure is preserved in the process, these double hydroxides display anion exchange capability, which is apparently potentially unlimited in respect of the chemical identity and structural diversity of the applicable A$^{n-}$ species.

Hydrotalcite is one well-documented representative of the family of double hydroxides having a layered structure. Heretofore symbolized by Htlc-CO$_3$, it is a Mg(II)-Al(III)-OH—CO$_3^{2-}$ system, and although some variations of the Al/Mg molar ratio are possible, it can be fairly described by the general formula of Mg$_6$Al$_2$ (OH)$_{16}$CO$_3$·4H$_2$O.

It is known however that a considerable number of double hydroxide-carbonates of distinctly different chemical composition can exist, where M(II) can be:

Mg(II), Cu(II), Ni(II), Co(II), Zn(II), Fe(II), Mn(II), Cd(II), Pb(II), and apparently Ca(II), Sr(II) or mixtures of these, and where M(III) can be:

Al(III), Ga(III), Ni(III), Co(III), Fe(III), Mn(III), Cr(III), V(III), as well as apparently Ti, In, Ce(III), La(III) or mixtures of all of the above.

Further, as previously noted, M(II) also can be replaced by Li(I). While the disclosure generally focuses on M(II) as being a divalent species, it should be understood that the scope of the invention will encompass monovalent species having similar characteristics to the divalent species.

Several of the above suggested systems have been synthesized and characterized, such as: Mg—Al—CO$_3$ (hydrotalcite, or Htlc-CO$_3$ as discussed above), Mg—Fe—CO$_3$ (pyroaurite), Mg—Cr—CO$_3$, Mg—Mn—CO$_3$, Ni—Al—CO$_3$, Ni—Fe—CO$_3$, Zn—Al—CO$_3$, Cu—Zn—Al—CO$_3$, Mg—Zn—Al—CO$_3$, Cu—CO—Zn—Al—CO$_3$, and also Li—Al—CO$_3$, where Li(I) replaces M(II).

Finally, and as suggested above, it will be apparent that the diversity in composition of these double hydroxide systems with layered structures is significantly increased by the large number of applicable anionic species of diverse chemical identity and structural character. A considerable number of layered double hydroxides of modified chemical composition are known, containing diverse guest anionic species other than CO$_3^{2-}$.

Such guest species could possess corrosion inhibitor capability if they constitute the anionic species of selected weak acids. Without limiting the scope of the present invention, and in addition to CrO$_4^{2-}$ known to the art, some examples of such weak acids credited with corrosion inhibitor quality, are:

ortho-phosphoric, pyrophosphoric, tripoly-phosphoric, poly-phosphoric acid;

mono- and di-alkyl or aryl-esters of ortho-phosphoric and pyro-phosphoric acid;

metaphosphoric, trimeta-phosphoric, poly-metaphosphoric acid;

phosphorous (phosphonic) acid;

derivatives of phosphonic acid, such as compounds known in industrial practice as NMPA and HEDPA;

alkyl and aryl esters of thio-phosphoric and dithio-phosphoric acid;

molybdic, phospho-molybdic, silico-molybdic acid;

boric acid;

cyanamidic acid;

nitrous acid;

derivatives of thio- and dithiocarbonic acid, such as o-alkyl esters derivatives of dithiocarbamic acid, such as N-alkyl dithiocarbamates;

pyrrolidinecarbodithioic acid;

various thio-organic compounds functionalized with one or multiple —SH group of acidic character, including:

2,5-dimercapto-1,3,4-thiadiazole or Bismuthiol I, and 2,4-dimercapto-s-triazolo-[4,3-b]-1,3-4-thiadiazole or C$_3$H$_2$N$_4$S$_3$, and 1,3,5-triazine-2,4,6(1H,3H,5H)-trithione, or trithiocyanuric acid (TMT), and dithiocyanuric acid, various N,N-, S,S- and N,S-substituted derivatives of the above compounds, such as 5-mercapto-3-phenyl-1,3,4-thiadiazoline-2-thione or Bismuthiol II and 5,5' thio-bis(1,3,4 thiadiazole-2(3H)-thione);

various S-substituted derivatives of trithiocyanuric acid;

dimer and polymer derivatives of the above, resulting from oxidative dimerization or polymerization of di- and poly-mercapto compounds, such as: 5,5' dithio-bis(1,3,4 thiadiazole-2(3H)-thione or $(DMTD)_2$, and $(DMTD)_n$, the polymer of DMTD and $(TMT)_2$, the dimer and polymers of TMT;

various combinations of all of the above;

soluble salts of DMTD and TMT;

poly-ammonium salt of DMTD or $(DMTD)_n$ and TMT formed with polyamines;

selected mercapto derivatives: mercapto-benzothiazole, mercapto-benzoxazole, mercapto-benzimidazole, or combinations of the above di- or poly-mercapto organic compounds such as:

di-mercapto derivatives of thiophene, pyrrole, furane, and of diazoles and thiadiazoles;

di- and tri-mercapto derivatives of pyridine, diazines, triazines and of benzimidazole and benzothiazole, such as:

dimercaptopyridine, 2,4-dithiohydantoine, and 2,4-dimercapto-6-amino-5-triazine;

carboxylic and di-carboxylic acids such as: ascorbic, salicylic acid, phthalic acid, nitro-phthalic acid and succinic acid; and derivatives of succinic acid such as: 1-(benzothiazol-2-ylthio)succinic acid.

It will be apparent that, with no intent to limit the scope of the present invention, the above described host-guest compositions can also be employed as constituents of ordinary physical mixtures with various corrosion inhibitor pigments, preferably constituted of non-toxic cationic and anionic species with corrosion inhibitor properties, such as: Mg, Ca, Sr, La, Ce, Zn, Fe, Al, Bi and, respectively, $MoO_4^{--}$, $PO_4^{---}$, $HPO_3^{--}$, poly-phosphates, $BO_2^-$, $SiO_4^{--}$, $NCN^-$, $WO_4^{--}$, phosphomolybdate, phosphotungstate, and various combinations of all of the above. Specific compounds include: zinc phosphate, cerium molybdate, calcium silicate, strontium borate, zinc cyanamide, cerium phosphotungstate and respectively, $ZnO$, $CeO_2$, $ZrO_2$ amorphous $SiO_2$ or combinations of these compounds.

Additionally, it will be evident that host-guest compositions can be also combined, in the form of ordinary physical mixtures, with diverse conductive polymer derivatives or composites with corrosion inhibitor properties, such as mixtures or compositions based on polyaniline, polypyrrole or polythiophene. Likewise, it is understood that the above list is not conclusive, and similar compounds and derivatives will yield similar results.

Of the above guest species, it has been discovered that 2,5-dimercapto-1,3,4 thiadiazole symbolized by $HS-CN_2SC-SH$ or "DMTD" and its derivatives inhibit atmospheric corrosion of aluminum, including Al 2024 T-3. It has been also proven that DMTD and various of its derivatives in pigment grade form are applicable as components of organic primers or in soluble or partially soluble form as an inhibitor constituent of conversion coating compositions intended for aluminum protection.

This discovery was not expected, considering that DMTD does not form essentially insoluble compounds with Al (III), of which this characteristic is generally a prerequisite for corrosion inhibition activity of organic compounds on metal substrates.

Although unexpected, this effect is explicable in light of the present research, however, considering the high chemical affinity displayed by organic thiol derivatives, in general, and specifically by DMTD and TMT, toward Cu(II) and Cu-rich surfaces. In the specific case of DMTD, it has been shown that DMTD spontaneously forms stable chemisorption layers on cathodically polarized Cu surfaces and, consequently, inhibits cathodic $O_2$ reduction in aqueous conditions. Based on this, it can be reasonably assumed that DMTD operates by mechanism similar to $CrO_4^{(2-)}$ on (cathodic) Cu-rich intermetallics of Al-2024 in atmospheric conditions.

Along with DMTD, it has also been discovered pursuant to the present invention, that trithiocyanuric acid, or TMT, which can be classified as a tri-mercapto derivative, and its derivatives are also effective corrosion inhibitors of aluminum in a similar fashion as DMTD. It has also been discovered that DMTD and TMT and their derivatives are effective corrosion inhibitors of galvanized steel and similar metal substrates, where these compounds interact with and protect the sacrificial zinc layer and, thus, indirectly protect the steel substrate.

As mentioned above, if double hydroxide systems with layered structure contain selected guest anionic species characterized by corrosion inhibitor activity, they could function as corrosion inhibitor pigments in organic coating applications. It will be readily apparent however, that as high as possible of a load (in the inorganic matrix) of the inhibitor guest anionic species is required in this application.

It appears that the $Htlc-CrO_4$ derivative is the only double hydroxide having a layered structure, containing guest anionic species characterized by recognized corrosion inhibitor ability, which has been suggested by the art as corrosion inhibitor pigment. In addition to the recognized toxicity however, this known $Htlc-CrO_4$ derivative is also characterized by a low load of the $CrO_4^{--}$ inhibitor guest species, which constitutes a significant shortcoming of any pigment grade inhibitor intended for organic coating applications.

A feasible explanation of this shortcoming relates to the generally practiced synthesis process of Htlc derivatives, which comprises the following steps:

thermal decomposition of $Htlc-CO_3$ at 500-600° C. (dehydration and decarbonation takes place resulting in a mixed oxide precursor); and reconstruction of the Htlc-like structure by exposure of the mixed oxide precursor to aqueous solutions of various soluble salts.

In this process, $OH^-$ (results in alkaline hydrolysis) and the available anionic species of the employed salts are absorbed and incorporated into the reconstructed solid matrix and a Htlc-like structure forms, where the $CO_3^{--}$ anion, which is present in the original hydrotalcite matrix, is substituted by guest anions.

However, alkaline hydrolysis of most neutral or basic salts of weak acids (such as $Na_2CrO_4$) affords relatively high concentration of $OH^-$ in aqueous solution, which competes (in the present case with the $CrO_4^{--}$ species) for the limited number of sites available for the guest species in the matrix, resulting in low absorption, or load of $CrO_4^{--}$.

As a direct consequence, the known synthesis procedure of "reconstruction" carried out by exposure of the mixed oxide precursor to soluble salt solutions, such as for example $Na_2CrO_4$, in general results in Htlc derivatives characterized by a relatively low load of the guest species. As demonstrated in the following Comparative Example 2, the low load is a significant limitation on this considered procedure, as related to corrosion inhibitor pigment synthesis. Due to this limitation, Htlc derivatives produced in solutions of salts are typically characterized by relatively low loads of the guest anionic species. A low content in the guest species implies a low stored inhibitor capacity, which results in a low release rate of the former, and ultimately renders such Htlc derivatives useless as corrosion inhibitor pigments.

It will be noted again, that corrosion inhibition "in degree" depends on the available concentration of the (guest) inhibitor species in the aqueous phase of the corrosion system; that is, there is a minimum critical concentration of the inhibitor species necessary at a corrosion site for effective performance. It will be apparent that the available concentration of the inhibitor species is a direct function of the load of the same in the pigment matrix. Consequently, it is reasonable to state that Htlc derivatives containing non-inhibitor guest species or carrying a low load of inhibitor species will not function as corrosion inhibitor pigments in organic coating applications, as disclosed above.

BRIEF DESCRIPTION OF THE DRAWINGS

FIGS. 1-9 are graphical prints representing IR spectra of products produced pursuant to the present invention.

DESCRIPTION OF THE PREFERRED EMBODIMENT

Figure 1:
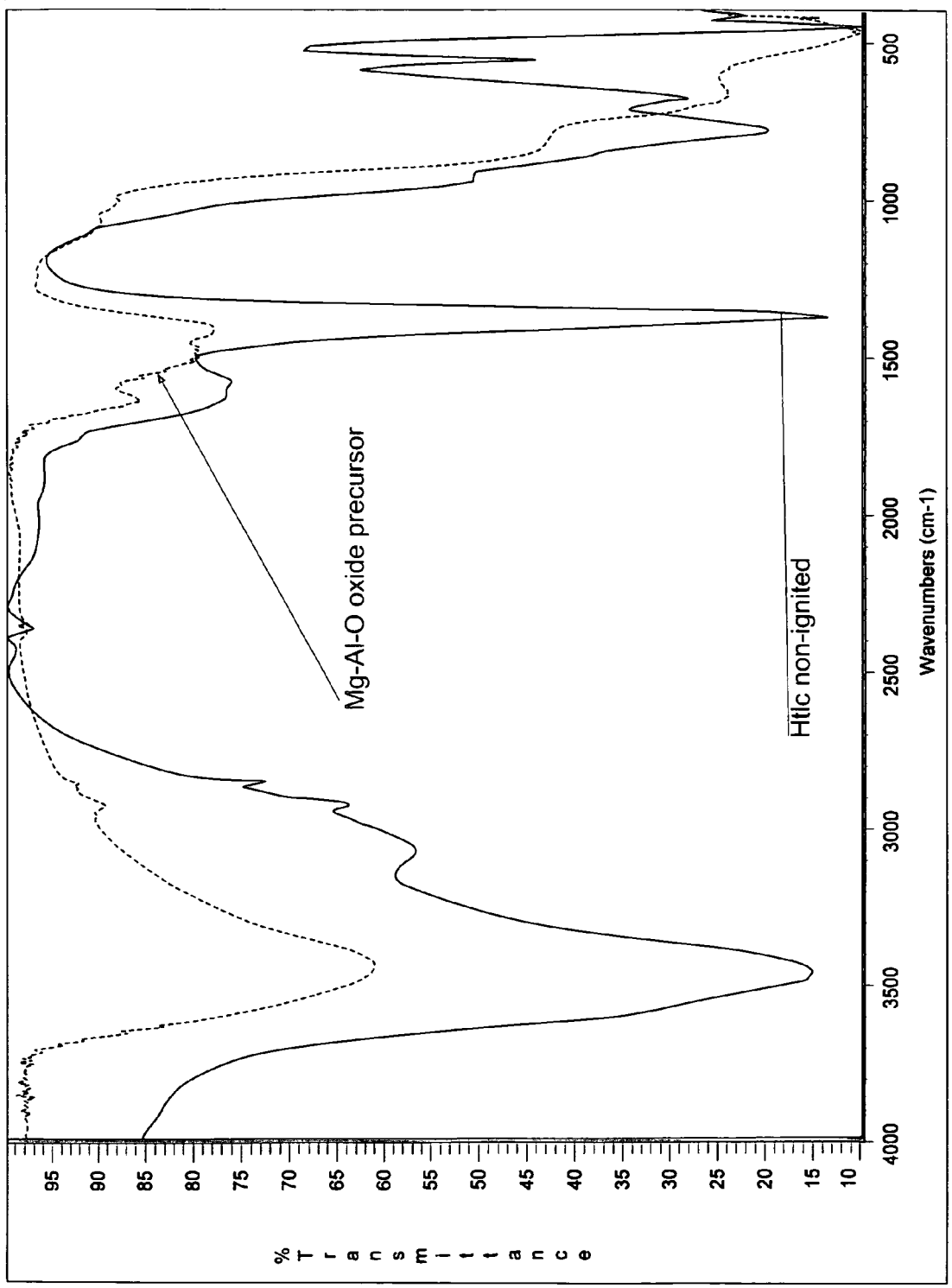

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

It will be obvious to one informed in the relevant art however, that the concept of the present invention applies generally to all double hydroxide systems having a layered structure and possessing anion exchange capability, as earlier specified. Specifically, however, and with no intent on limiting the scope of the present invention, the subsequent disclosures which relate to the synthesis of pigment grade corrosion inhibitor host-guest compositions generally will be exemplified by hydrotalcite based systems, that is, by the synthesis of double hydroxides with layered structure of:

stated as a generic composition, where M(II) and M(III) are Mg(II) and Al(III), respectively, and $A^{n-}$ is diverse corrosion inhibitor anionic species.

Htlc matrices and related Mg—Al—O mixed oxide precursors, employed in the reconstruction procedure of Htlc derivatives, are inherently quite alkaline, having a hydrolysis pH~11, observed pursuant to the present invention. If the reconstruction synthesis is performed in alkaline salt solutions, this inherent alkalinity additionally limits the absorption of guest anionic species into Htlc matrices, resulting in Htlc derivatives of low load in guest species. As indicated earlier, the load of $A^{n-}$ guest anionic species is variable between the limits of $1/n \leq A^{n-}/M(III) \leq 1$ in Htlc derivatives and potentially will be minimized by OH—, the dominant anionic species in these systems.

It has been discovered, pursuant to the present invention, that the reconstruction procedure performed in solutions or dispersions of weak acids, acid salts of weak poly-basic acids or neutral salts with hydrolysis pH<9, rather than in solutions of alkaline salts of such acids, yields a high load of the guest anionic species in the resulting Htlc derivatives. It is the current understanding that because of the comparatively low concentration of OH⁻ in these systems, the competition for the limited number of sites available for guest species in the matrix tends to maximize the absorption of the guest anionic species. This maximized absorption is apparent primarily with acids which do not form insoluble salts with Mg(II) and/or Al(III) cations, such as thio-organic compounds with acidic —SH functionalities, as demonstrated in several subsequently presented Examples. (contrast Comparative Example 2 with Examples 2-4).

It has been also discovered pursuant to the present invention that absorption of guest species of neutral or alkaline salts can be enhanced and assisted by employing strong acids, preferably mono-basic acids for pH adjustment. For example, $HNO_3$ can be employed to enhance absorption of anions of alkaline salts into an Htlc matrix. It has been further observed that poly-valent anionic species appear to display enhanced affinity toward Htlc matrices. Poly-valent species are preferably absorbed as compared to mono-valent species.

Also pursuant to the present invention, several new Htlc derivatives have been synthesized, containing guest anionic species with corrosion inhibitor ability, as follows: $MoO_4^{--}$, $PO_4^{---}$, $BO_2^{-}$, $NCN^{--}$, $NO_2^{-}$, and 2,5-dimercapto-1,3,4-thiadiazole$^{(--)}$ ("DMTD") 2-mercaptobenzothiazole$^{(-)}$, and trithiocyanuric acid$^{(---)}$ (TMT). Htlc derivatives containing $CrO_4^{-}$ species, which are known to the art, were also synthesized, but with a significantly higher guest species content, as described in Example 2.

These pigment grade products are generally characterized by high guest anionic species content and are applicable in paint formulations and organic coatings. Once in contact with an aqueous medium, it has been observed that the Htlc derivatives produced according to the present invention release guest anionic species by dissolution and by anion exchange at rates controlled by the environment. Thus, these derivatives function as pigment grade corrosion inhibitors, thereby greatly extending the number of known corrosion inhibitor pigments.

In practice, the reconstruction synthesis was carried out by dispersing a finely ground Mg—Al—O mixed oxide precursor (obtained by thermal decomposition of Htlc-$CO_3$) in a solution or dispersion of weak acids, anhydrides or acid salts or neutral salts of weak acids. The mixture was then extensively stirred. Notably, in the case of some weak acids, such as phosphoric acid, which form insoluble phosphates with Mg(II) and Al(III), the conversion of the solid matrix was prevented by maintaining a pH>8 in the system. Subsequent to the completion of the absorption process, the solid phases were separated by filtration. The resultant presscakes were than washed extensively with a volume of water approximately 2-5 times the volume of the filtrate, dried overnight at 110° C., and pulverized. The guest species load of the Htlc derivatives was determined by analysis of the resultant filtrates and wash waters for contents of the same species. In some specific cases, as noted in the following relevant examples, the IR spectrum of the synthesized pigment grade Htlc derivative has an altered structure in comparison to Htlc and indicates the presence of the guest species.

COMPARATIVE EXAMPLES

The examples subsequently presented are intended to provide evidence regarding existing limitations of the art in comparison to the present invention. More specifically, the subsequent examples are intended to present the "reconstruction" procedure currently practiced in the art and to identify the only known, prior to this invention, Htlc derivative containing guest anionic species with corrosion inhibitor capability, which is Htlc-$CrO_4^{2-}$.

Comparative Example 1

A generic Mg—Al—$CO_3$—OH type of hydrotalcite, Htlc-$CO_3$ containing about 9% $CO_3$, (from Sigma-Aldrich), was thermally decomposed by ignition as known in the art, as follows: approximately 50 g of finely ground such product was heated to approximately 600° C., maintained for about one (1) hour, and subsequently cooled in a closed environment. A weight loss of approximately 43% was observed, due to decarbonation and dehydration. The resulting solid powder, believed to be a mixed Mg—Al—O oxide, with an appearance similar to the original Htlc, was used in all subsequent examples of the present invention. Relevant analytical data are presented below in Table 1. FIG. 1 presents both, the IR spectrum of the original non-ignited Htlc and of the mixed Mg—Al—O oxide.

TABLE 1

| Appearance | White powder |
|---|---|
| Yield (g) | 28.5 |
| $CO_3$ % | 0 |
| pH, in saturated leachet | 10.7 |

Comparative Example 2

A generic Mg—Al—OH—$CrO_4^{2-}$ type of Htlc was produced by the reconstruction procedure known to the art as follows: 20 g of finely ground mixed Mg—Al—O oxide precursor (see Comparative Example 1), was dispersed into 200 ml of a 0.2M $Na_2CrO_4$ solution, stirred intensively at ambient temperature for four (4) hours, and filtered. The resultant presscake was washed extensively with a volume of water approximately four times that of the volume of the filtrate and subsequently dried overnight at 110° C. The filtrate appeared yellow in color, and a filtrate pH=13 was observed. This is an indication that, under the given practical condition, the absorption capacity of the solid matrix was exhausted and the maximum load of $CrO_4^{2-}$ possible under the experimental conditions was absorbed into the matrix of the resultant Htlc-$CrO_4^{2-}$ derivative. The $CrO_4^{2-}$ content of the product was determined by iodometric titration of the filtrate and the wash water. Pertinent analytical data are presented below in Table 2. The comparatively low load of the $CrO_4^{2-}$ (5.8% by weight) was noted as significant.

TABLE 2

| Htlc-$CrO_4^{2-}$ Results (1) | |
|---|---|
| Appearance | Light yellow powder |
| Yield (g) | 28.0 |
| $CrO_4^{2-}$ % | 5.8 |
| pH, in saturated leachet | 9.3 |

REFERENTIAL EXAMPLES

The following examples are references to be used in formulating specific examples and test subjects to be used in connection with specific examples listed in the EXAMPLE section.

Referential Example 1

This example is intended to disclose one synthesis procedure applicable for incorporating DMTD into a complex solid matrix corresponding to the general composition of 45% $Zn(DMTD)_2$/32% $Zn_3(PO_4)_2$ $2H_2O$/23% ZnO.

In practice, the synthesis was carried out as follows:

6.33 moles (515.0 g) of high grade ZnO (0.25 micron average particle size), was re-slurried in 2000 ml water at 50-60° C. and intense agitation for 1 (one) hour. After that, 1.5 moles of $H_3PO_4$, as 50% solution, were introduced gradually into the ZnO slurry and the same conditions were continued for 30 minutes. Subsequently, an aqueous suspension of 2.5 moles of DMTD in 1500 ml water was introduced in about 30 minutes. The intensively stirred slurry was heated to 75-80° C. and the same conditions were maintained for 2 (two) hours. The solid phase was isolated by filtration, dried at 100-105° C. to 0.5-2% moisture content and pulverized.

Relevant analytical data are presented below, in Table A.

TABLE A

| Measured quality parameters | Determined values |
|---|---|
| appearance | Light yellow powder |
| specific gravity | 2.7 |
| solubility, at 24° C. | 0.3 g/l |
| pH (saturated extract) | 5-6 |
| oil abortion, lbs/100 lbs | 33 |
| yield, g | 992 |

Referential Example 2

Pigment grade Sr-doped amorphous silica of $SrSiO_3.11SiO_2.5.7H_2O$ composition, containing approximately 9.5% Sr species, was synthesized according to the following procedure:

Initially, solution A was prepared by reacting 0.51 mole of $SrCO_3$ and 3.5 moles of $HNO_3$ and dissolving the composition in 1300 ml of water. Solution B was prepared by dissolving 1.9 moles of sodium silicate of $Na_2O(SiO_2)_{3.22}$ composition (from Hydrite Chemical Co., Wis.), in 900 ml of water.

Solutions A and B were delivered simultaneously and with identical rates for approximately 1 (one) hour into 500 ml of intensively stirred water at 70-85° C. At the end, the pH was adjusted to 8-8.5 and the same conditions were maintained for an additional 2 (two) hours, after which the resultant solid phase was separated by filtration, washed to soluble salt-free conditions, dried at approximately 105° C. overnight, and pulverized.

Figure 7:
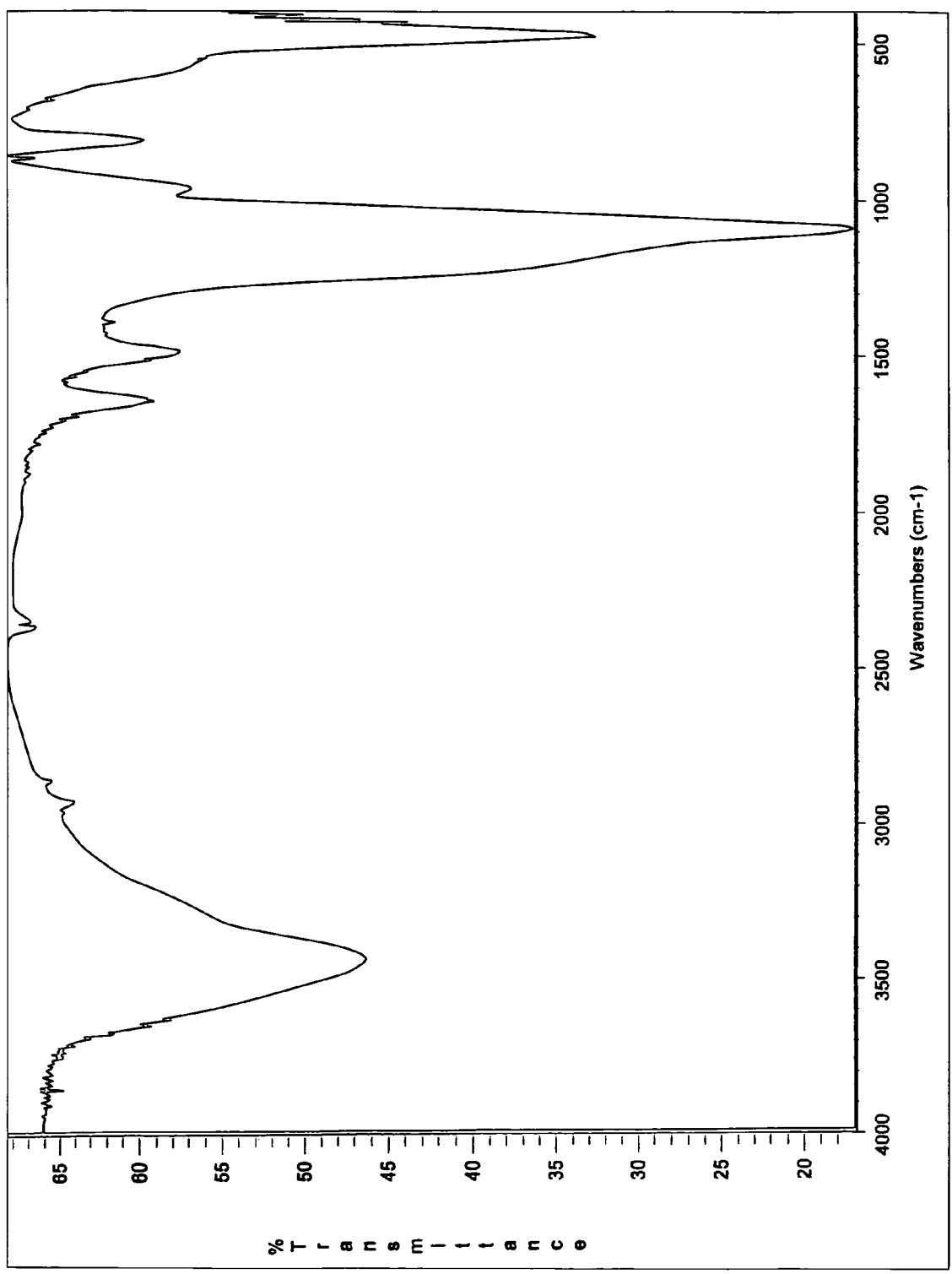

Relevant analytical data and IR spectrum results are presented below in Table B and FIG. 7, respectively.

TABLE B

| Measured Parameters | Determined Values |
|---|---|
| appearance | White powder |
| specific gravity | 1.8-1.9 |
| pH(saturated extract) | 9.0-9.3 |
| oil absorption, lbs/100 lbs | 52-60 |

TABLE B-continued

| Measured Parameters | Determined Values |
|---|---|
| Sr, % (calculated) | 9.5 |
| $H_2O$, % (by ignition at 600° C.) | 16.5 |
| yield, g | 471 |

Referential Example 3

A pigment grade mixture of trithiocyanuric acid+Sr-doped Amorphous Silica of $SrSiO_3.11SiO_2.5H_2O+1TMT$ (approximate composition), containing about 8% Sr (calculated) and 17% TMT (calculated), was produced as follows:

100 g of trithiocyanuric acid, in powder form, were blended into 460 g of Sr-doped amorphous silica in dry granular form. The Sr-doped amorphous silica was synthesized and processed as shown in Referential Example 2. The obtained mixture was subsequently pulverized to a fineness of about 6 on the Hegman scale.

Trithiocyanuric acid was obtained from an aqueous solution of tri-sodium-trithiocyanurate, by adjusting the pH of the solution to about 3, filtering, washing, and drying the resultant solid phase.

Figure 8:
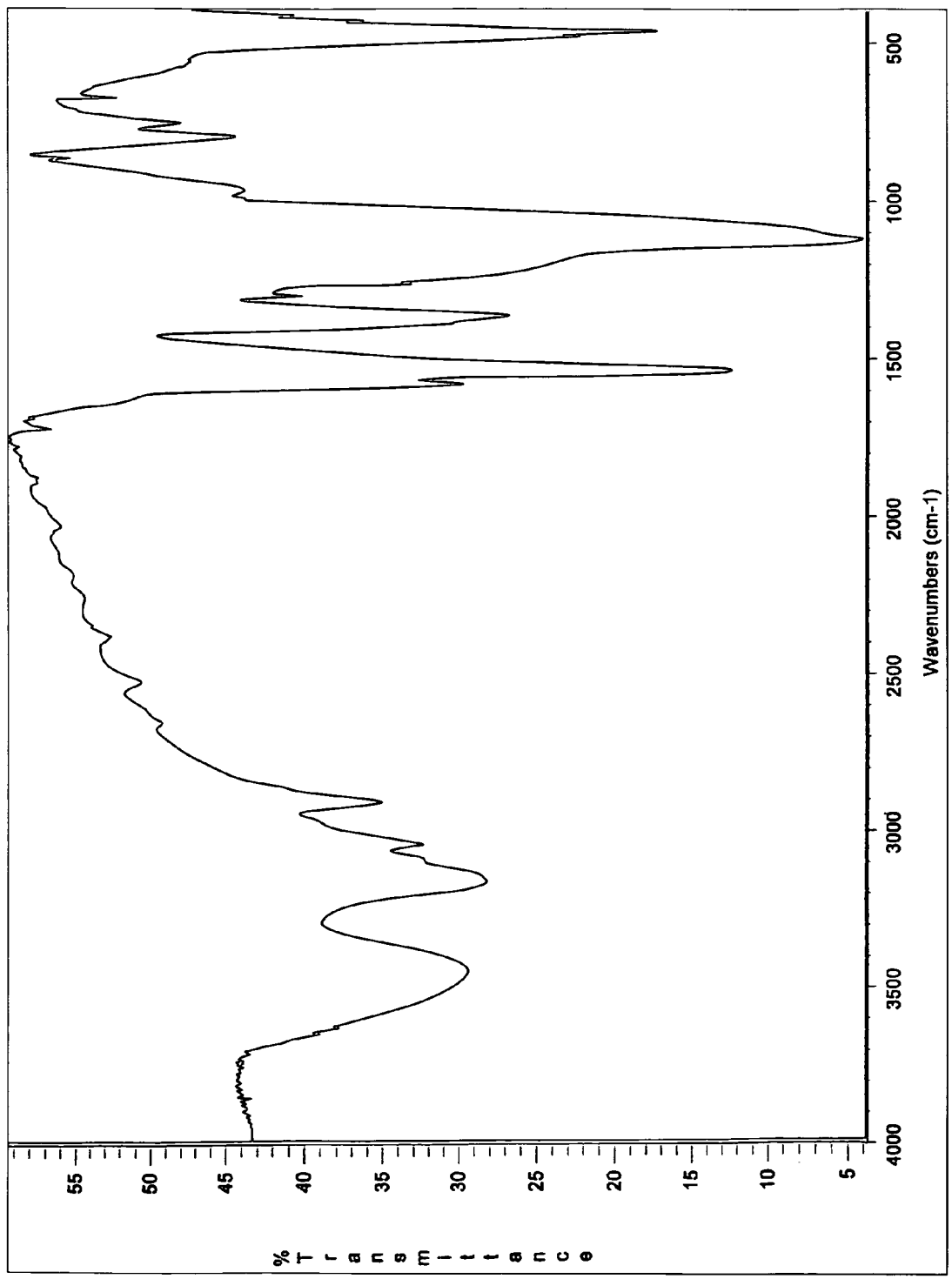

Relevant analytical data and IR spectrum results are presented below in Table C and in FIG. 8, respectively.

TABLE C

| Measured Parameters | Determined Values |
|---|---|
| appearance | Light yellow powder |
| specific gravity | 1.7 |
| pH(saturated extract) | 6.9 |
| oil absorption, lbs/100 lbs | 75-85 |
| Sr, % (calculated) | 7.9 |
| TMT % (calculated) | 17 |
| yield, g | 560 |

Referential Example 4

This example is intended to demonstrate the application of trithiocyanuric acid ("TMT") as a corrosion inhibitor constituent of an amorphous silica+TMT pigment grade mixture in a typical coil coating formulation.

The pigment grade mixture of $SrSiO_3.11SiO_2.5H_2O+1TMT$ composition was synthesized according to the process in Referential Example 3, and was tested (See Test formulation, Table D) on galvanized steel (from L.T.V. Steel Co.), in comparison with commercial strontium chromate (Control A formulation, Table D), the "gold" standard of the industry for corrosion inhibitor pigments, and respectively, Sr-doped amorphous silica synthesized according to Referential Example 2 (Control B formulation, Table D).

The typical solvent-borne polyester coil primer formulation is specifically recommended for galvanized steel protection. Description of the test formulation, and control formulations A and B are presented below in Table D.

TABLE D

| Components of Formulations | Trade Names & Suppliers of Components | Parts by Weight | | |
|---|---|---|---|---|
| | | Test Formulation | Control Formulation A | B |
| Polyester Resin | EPS 3302 (1) | 536.0 | 536.0 | 536.0 |
| Solvents | Aromatic 150 | 118.0 | 118.0 | 118.0 |
| | Diacetone Alcohol | 73.5 | 73.5 | 73.5 |
| Fillers | RCL-535 $TiO_2$ (2) | 46.0 | 46.0 | 46.0 |
| | Aerosil R972 (3) | 2.1 | 2.1 | 2.1 |
| Catalyst | Cycat 4040 (4) | 7.6 | 7.6 | 7.6 |
| Hardener | Cymel 303 (4) | 73.6 | 73.6 | 73.6 |
| Corrosion Inhibitor Pigments | | | | |
| Strontium Chromate | $SrCrO_4$-176 (5) | — | 143.5 | — |
| Sr-doped amorphous silica | As shown in Referential Example 2 | — | — | 120.0 |
| Sr-doped silica + TMT pigment grade mixture | As shown in Referential Example 3 | 150.0 | — | — |
| Total Weight | | 1006.8 | 1000.3 | 976.8 |

Raw Material Suppliers:
(1) Engineering Polymer Solutions
(2) Millennium Inorganic Materials
(3) DeGussa Corporation
(4) Cytec.
(5) Wayne Pigment Corporation The formulation was ground to a fineness of 6.5-7.0 Hegman before application.

Referential Example 5

Di-cyclohexyl mono-ammonium salt of trithiocyanuric acid was synthesized according to the following procedure:

0.1 mole of di-cyclohexylamine (from Aldrich Chemical), dissolved in 0.15 moles of $H_2SO_4$ solution of approximately 20%, was subsequently reacted by agitation with 0.1 mole of Na-trithiocyanurate (from Aldrich Chemical) dissolved in 100 ml water. After the pH was adjusted to 6.5-7.0, the resulting slurry was filtered, washed to a soluble salt free condition, dried at approximately 100° C., and the solid product was subsequently pulverized.

Figure 6:
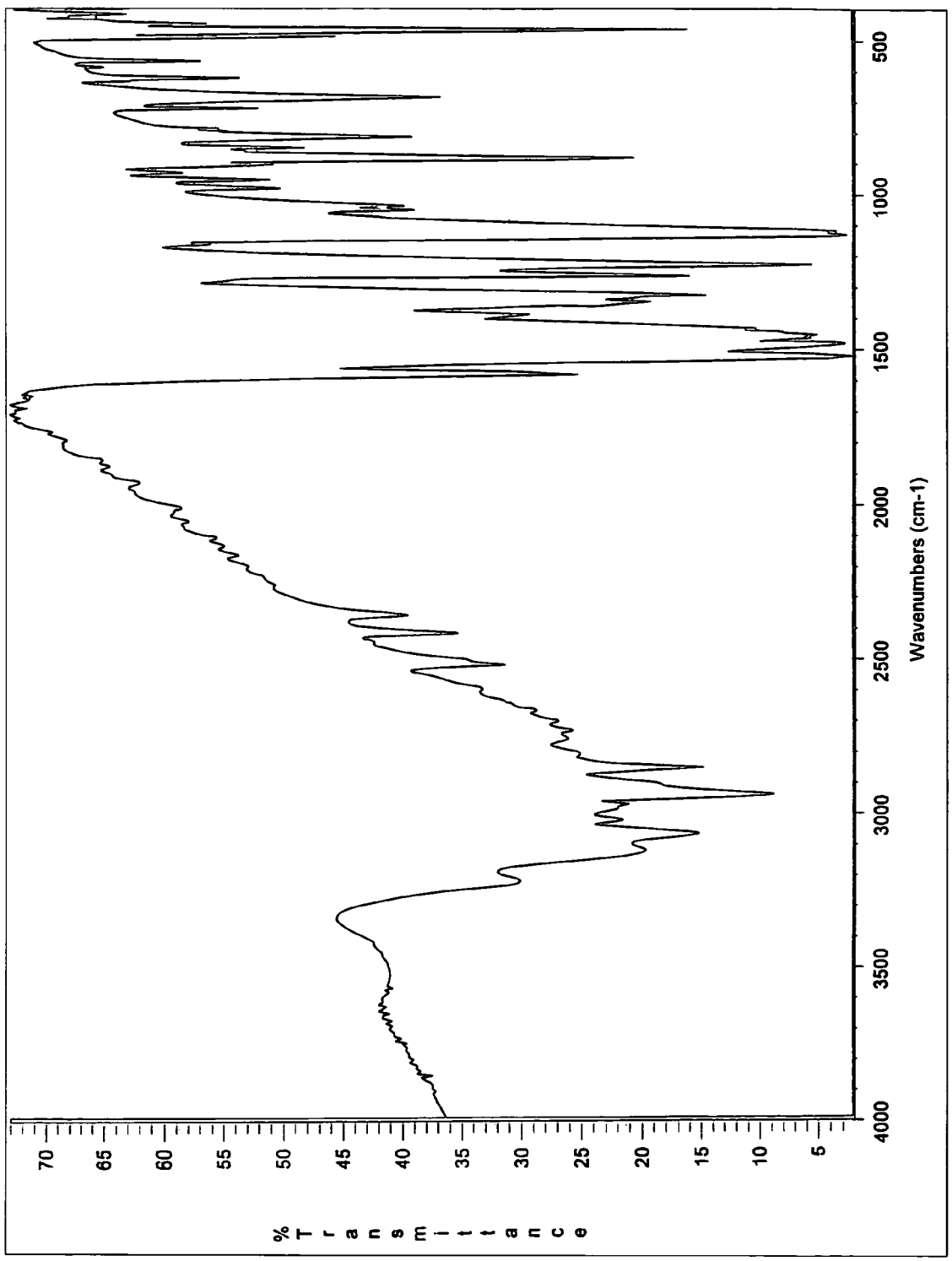

Yield: 34 g, 95% of theoretical. The relevant IR spectrum is presented in FIG. 6.

EXAMPLES

All subsequently presented Examples are intended to provide detailed descriptions to demonstrate the effectiveness of the present invention with respect to corrosion inhibition.

Example 1

A generic Mg—Al—OH—$CrO_4^{2-}$ type of Htlc was produced in a similar fashion as described in Comparative Example 2, except that in the present example, 20 g of the Mg—Al—O precursor (see Comparative Example 1) was dispersed in 200 ml of 0.2M $Na_2Cr_2O_7$ (an acidic salt of chromic acid) and stirred for (4) four hours. The filtrate appeared yellow color and had a pH=13. Pertinent analytical data is presented below in Table 3.

TABLE 3

| Htlc-$CrO_4^{2-}$ Results (2) | |
|---|---|
| Appearance | Yellow powder |
| Yield (g) | 33.0 |
| $CrO_4^{2-}$ % | 10.8 |

Example 2

A generic Mg—Al—OH—$CrO_4^{2-}$ type of Htlc was produced in a similar fashion as described in Example 1, except that in the present example, 20 g of the Mg—Al-O precursor was dispersed in 200 ml solution containing 10.0 g (0.1 moles) of $CrO_3$ (chromic acid) and stirred for 4 (four) hours. After filtration, the resulting presscake was washed thoroughly, until the wash water filtered through the presscake was colorless. A total filtrate volume of about 800 ml was collected, appearing yellow with a pH=7.5. Pertinent analytical data is presented below in Table 4. The high $CrO_4^{2-}$ load (19% by weight) of the resultant Htlc derivative when compared to Comparative Example 2 was noted as significant.

TABLE 4

| Htlc-$CrO_4^{2-}$ Results (3) | |
|---|---|
| Appearance | Yellow powder |
| Yield (g) | 33.4 |
| $CrO_4^{2-}$ % | 19.2 |

Example 3

A generic Mg—Al—OH-DMTD (where DMTD stands for 2,5-dimercapto-1,3,4-thiadiazole) type of Htlc was produced following the procedure described in Example 1, except that in the present example 20 g of the Mg—Al—O precursor was dispersed in 200 ml water containing 0.066 moles of $Na_2$-DMTD and stirred for (4) four hours. The total DMTD content of the filtrate and wash water was determined gravimetrically by precipitation as Pb-DMTD. The collected yellow filtrate was alkaline with a pH=12.5. Pertinent analytical data is presented below in Table 5.

TABLE 5

| Htlc-DMTD Results | |
|---|---|
| Appearance | Yellow powder |
| Yield (g) | 28.2 |
| DMTD % | 10.0 |

Example 4

Figure 2:
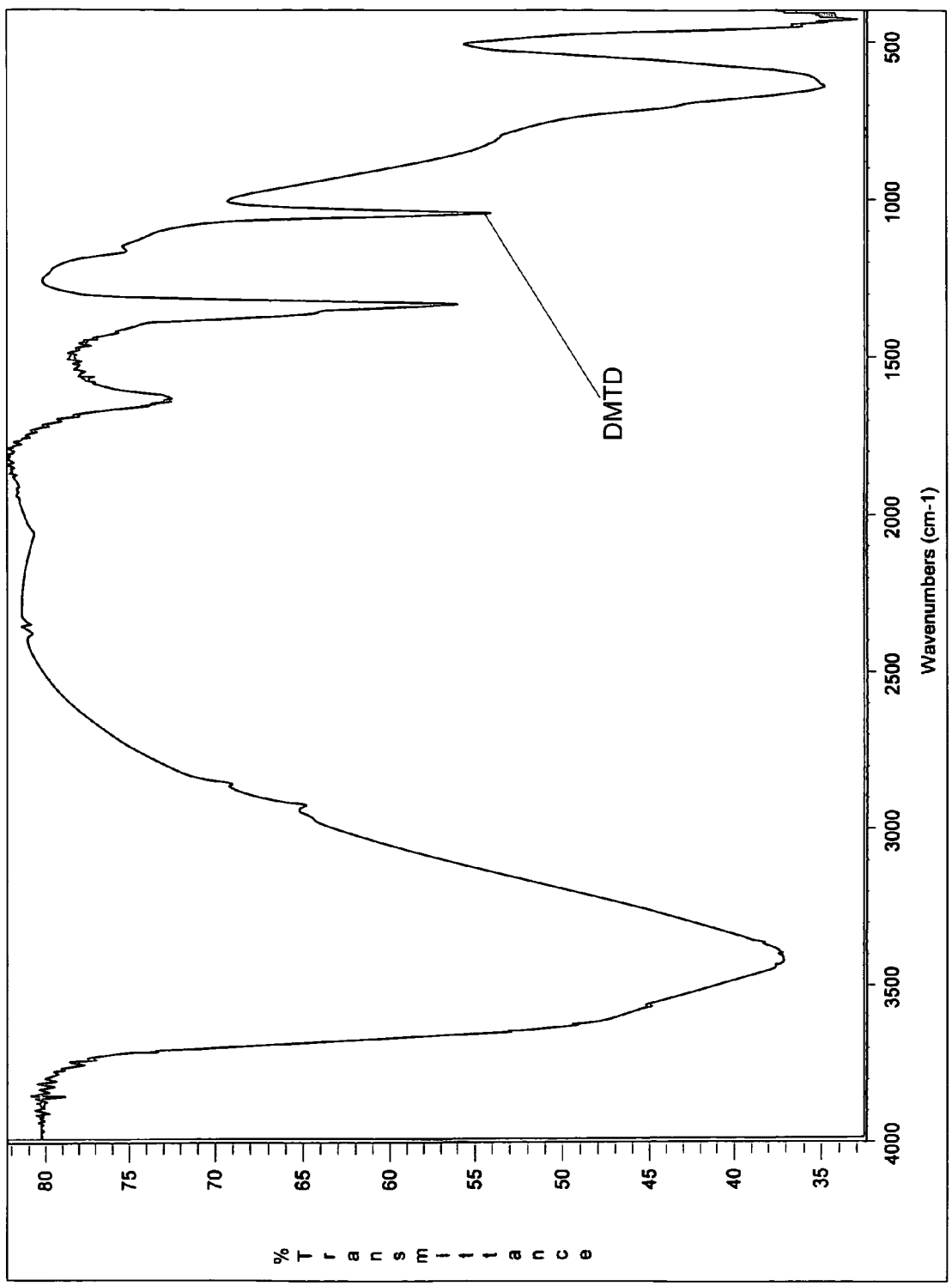

A generic Mg—Al—OH-DMTD type of Htlc was produced following the procedure described in Example 3, except that in the present example 20 g of the Mg—Al—O precursor was dispersed in 200 ml water containing 16 g of dispersed and partially dissolved DMTD, and stirred for (4) four hours. The collected yellow filtrate was alkaline at pH=8.5. Relevant analytical data is shown below in Table 6 and IR spectrum is presented in FIG. 2. Of significance, the IR spectrum of this product appears altered and shows the presence of the DMTD guest in the matrix. The high load of DMTD (22% by weight) was also noted.

TABLE 6

| Htlc-DMTD Results (2) | |
|---|---|
| Appearance | Yellow powder |
| Yield (g) | 32.6 |
| DMTD % | 22.0 |

Example 5

A generic Mg—Al—OH—$MoO_4^{2-}$ type of Htlc was produced in similar fashion as described in Example 1 except that in the present example 20 g of the Mg—Al—O mixed oxide precursor was dispersed in 200 ml solution containing 0.04 moles of $Na_2MoO_4$. The total $MoO_4^{2-}$ content of the filtrate and wash water was determined gravimetrically by precipitation as $SrMoO_4$. The collected filtrate was alkaline at pH=13. Relevant analytical data is presented below in Table 7.

TABLE 7

| Htlc-$MoO_4$ Results (1) | |
|---|---|
| Appearance | White powder |
| Yield (g) | 29.8 |
| $MoO_4$ % | 7.9 |

Example 6

A generic Mg—Al—OH—$MoO_4^{2-}$ type of Htlc was produced according to Example 5 except that in the present example 20 g of the Mg—Al—O mixed oxide precursor was dispersed in 200 ml water containing 8.0 g of $MoO_3$ and was stirred for (4) four hours. The resultant filtrate's pH was 9.7. Relevant analytical data is presented below in Table 8. The comparatively high $MoO_4^{2-}$ load of the resultant Htlc derivative was noted.

TABLE 8

| Htlc-$MoO_4$ Results (2) | |
|---|---|
| Appearance | White powder |
| Yield (g) | 37.6 |
| $MoO_4$ % | 20.8 |

Example 7

A generic Mg—Al—OH-TMT type of Htlc (where TMT stands for 1,3,5-Triazine-2,4,6(1H,3H,5H)-trithione, or trithiocyanuric acid was produced in similar fashion as described in Example 3, except that in the present example, 20 g of the Mg—Al—O mixed oxide precursor was dispersed in 200 ml water containing 0.02 moles of tri-sodium salt of TMT and was stirred for (4) four hours. The collected wash water mixed with the filtrate was analyzed for TMT content by gravimetric assessment by precipitation at a pH=3. The resultant filtrate was very alkaline with a pH=13.4. Relevant analytical data is presented below in Table 9.

TABLE 9

| Htlc-TMT Results | |
|---|---|
| Appearance | Off-white powder |
| Yield (g) | 29.0 |
| TMT % | 10.0 |

Example 8

Figure 3:
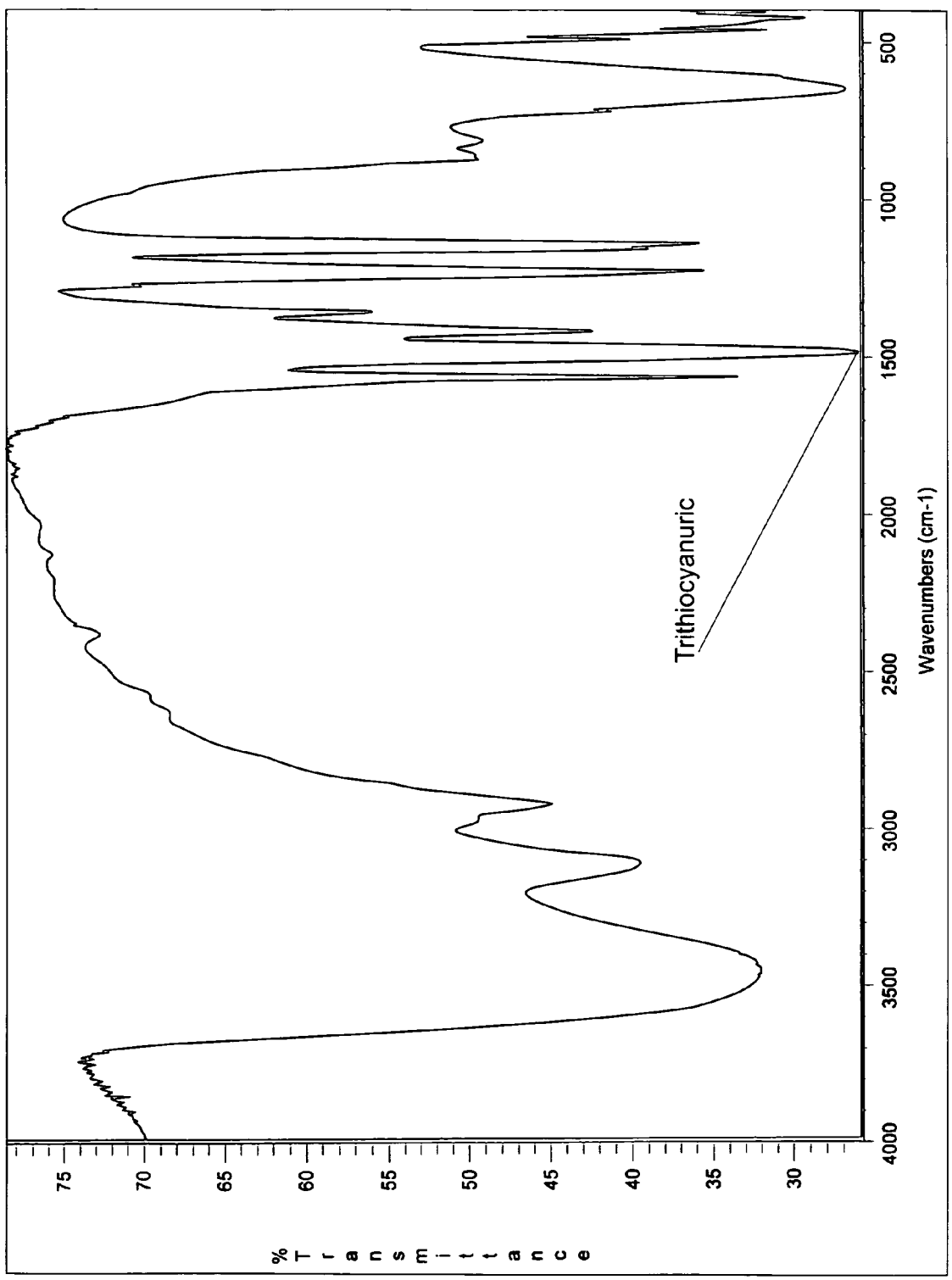

A generic Mg—Al—OH-TMT type of Htlc was produced in similar fashion as described in Example 7 except that in the present example 20 g of the Mg—Al—O mixed oxide precursor was dispersed in 200 ml water containing 19.0 g of TMT in dispersed form, and was stirred for (4) four hours. The resultant filtrate had a pH=8.7. Relevant analytical data are shown below in Table 10 and the pertinent IR spectrum is presented in FIG. 3. The high load (40% by weight) of TMT in the resultant Htlc derivative was noted as significant.

TABLE 10

| Htlc-TMT Results (2) | |
| --- | --- |
| Appearance | Off-white powder |
| Yield (g) | 40.0 |
| TMT % | 40.0 |

Example 9

Figure 4:
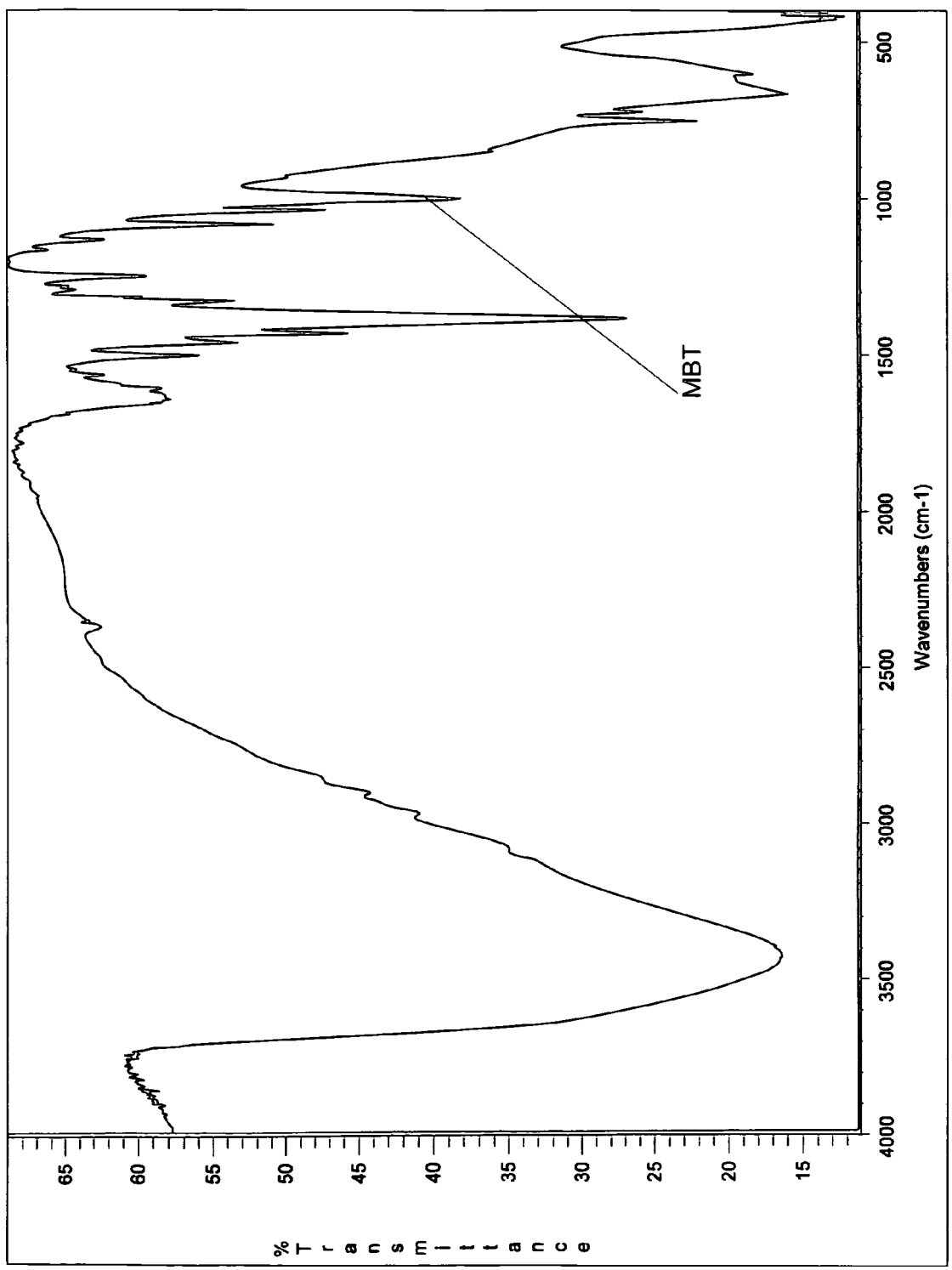

A generic Mg—Al—OH-MBT type of Htlc (where MBT stands for 2-Mercaptobenzothiazole) was produced in similar fashion as described in Example 7 except that in the present example 20 g of the Mg—Al—O mixed oxide precursor was dispersed in 200 ml water containing 9.0 g of MBT in dispersed form, and was stirred for (4) four hours. The resultant filtrate was determined gravimetrically by precipitation at pH=3 to contain approximately 0.6 g of MBT. The filtrate's pH was determined to be 9.0. Relevant analytical data is shown below in Table 11 and relevant IR Spectrum is presented in FIG. 4. The high load (41% by weight) of MBT in the resultant Htlc derivative was noted as significant.

TABLE 11

| Htlc-MBT Results | |
| --- | --- |
| Appearance | Off-white powder |
| Yield (g) | 40.4 |
| MBT % | 41.6 |

Example 10

A generic Mg—Al—OH—$BO_2^-$ type of Htlc was produced in similar fashion as described in Example 7 except that in the present example 20 g of the Mg—Al—O mixed oxide precursor was dispersed in 200 ml water containing 4.44 g of boric acid ($H_3BO_3$) in dispersed form, and was stirred for (4) four hours. The resultant filtrate's pH was 10.3 and was found to be void of borate species. Pertinent analytical data is presented below in Table 12.

TABLE 12

| Htlc-$BO_2^-$ Results | |
| --- | --- |
| Appearance | White powder |
| Yield (g) | 31.8 |
| $BO_2^-$ % | 9.9 |

Example 11

Figure 5:
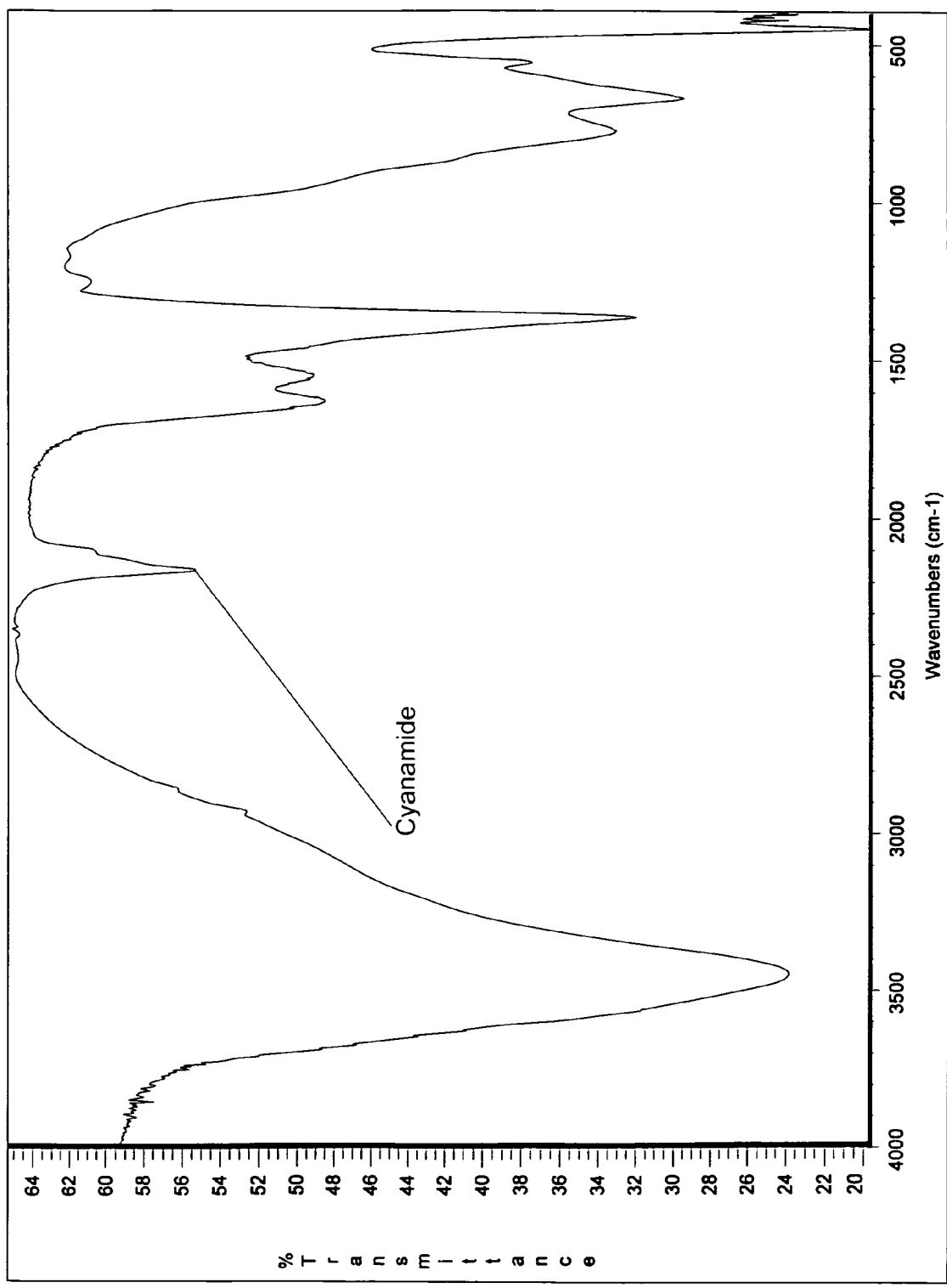

A generic Mg—Al—OH—$NCN^{2-}$ type of Htlc was produced in similar fashion as described in Example 7, except that in the present example 20 g of the Mg—Al—O mixed oxide precursor was dispersed in 200 ml water containing 4.5 g of $H_2NCN$ (cyanamidic acid) and was stirred for (4) four hours. The filtrate's pH was 10.3 and the filtrate was found void of cyanamide species. Relevant analytical data is presented below in Table 13 and pertinent IR spectrum is presented in FIG. 5.

TABLE 13

| Htlc-$NCN^{2-}$ Results | |
| --- | --- |
| Appearance | White powder |
| Yield (g) | 33.0 |
| $NCN^{2-}$ % | 13.6 |

Example 12

A generic Mg—Al—OH—$NO_2^-$ type of Htlc was produced in similar fashion as described in Example 7 except that in the present example, 20 g of the Mg—Al—O mixed oxide precursor was dispersed in 0.200 ml water containing 14.0 g of $NaNO_2$, and by gradual addition of diluted $HNO_3$, a pH=9 was established. Subsequently, the dispersion was stirred for four hours and processed. The filtrate's pH was 9.7.

Analytical data and IR spectrum are presented below in Table 14 and FIG. 9, respectively.

TABLE 14

| Htlc-$NO_2^-$ Results | |
| --- | --- |
| Appearance | White powder |
| Yield (g) | 32.0 |
| $NO_2^{2-}$ % | Not Analyzed |

Example 13

A Htlc-DMTD derivative, containing 22% DMTD, synthesized according to Example 4, was tested for DMTD release in contact with water, as follows:

5.0 g of finely ground Htlc-DMTD was dispersed in 50 ml of water by intense stirring for 2(two) hours, after which it was filtered. The presscake was then washed and the resultant filtrate and wash water were analyzed for DMTD content. In order to assess DMTD release by anion exchange mechanism, the same process was simultaneously performed on a distinct 5.0 g of Htlc-DMTD with an additional 0.5 g of NaCl (0.008 moles) introduced into the system. The amount of DMTD release was 0.06 g (0.0004 moles) when in contact with water, and 0.15 g (0.001 moles) when in the presence of $Cl^-$ species. A good correlation between $Cl^-$ ions available for ion exchange and released DMTD (see the above mole numbers) was observed and it was concluded that the Htlc-DMTD derivative synthesized according to the present invention releases DMTD species preferentially by the anion exchange mechanism.

Example 14

A generic Mg—Al—OH—$CrO_4^{2-}$ type of Htlc derivative (containing 19% $CrO_4^{2-}$) was synthesized according to Example 2, and was tested for $CrO_4^{2-}$ release in water, as follows: 5.0 g of the present Htlc-$CrO_4^{2-}$ derivative in a finely ground form was dispersed in 100 ml water by stirring for one (1) hour. The derivative was then left to settle and the yellow color of the supernatant was visually observed. It was concluded that this Htlc-$CrO_4^{2-}$ derivative displays $CrO_4^{2-}$ release when in contact with water, similarly to the behavior of chromate pigments.

Example 15

This example shows application of one of the guest species, a DMTD derivative, as a constituent of a corrosion inhibitor pigment:

A pigment grade composite of 45% $Zn(DMTD)_2$/32% $Zn_3(PO_4)_2 \cdot 2H_2O$/23% ZnO, synthesized according to Referential Example 1, was tested on aluminum, and compared to a double control: commercial strontium chromate (Control A), which is the "gold" standard of the industry for corrosion inhibitor pigments and a molybdate-based product (Control B), which is considered representative of commercially available non-chromate corrosion inhibitor pigments. The test was performed in a typical two-component aircraft primer formulation, specifically recommended for aluminum protection.

The description of the different versions of this formulation, the Test primer and of the Control A and Control B primers, are presented below in Table 15.

TABLE 15

| Components of Formulations | Trade Names & Suppliers of Components | Test | Control A | B |
|---|---|---|---|---|
| Epoxy Base/Part A | | | | |
| Epoxy Resin | Shell Epon 1001 CX75 (1) | 163.0 | 163.0 | 163.0 |
| Solvents | Glycol ether PM | 148.0 | 148.0 | 148.0 |
| | MIBK | 36.7 | 36.7 | 36.7 |
| Fillers | RCL-535 TiO2 (2) | 20.6 | 20.6 | 20.6 |
| | Min-U-Sil 15 (3) | 26.0 | 26.0 | 26.0 |
| | 12-50 Talc (4) | 49.3 | 49.3 | 49.0 |
| Corrosion Inhibitor Pigments | | | | |
| $Zn(DMTD)_2$ in solid matrix composite (See Ref. Example 1) | See Referential Example 1. | 78.0 | — | — |
| Strontium Chromate | SrCrO4-176 (5) | — | 107.5 | — |
| $MoO_4^{(2-)}$ based pigment. | Commercial (6) | — | — | 86.0 |
| Total part A - weight | | 551.0 | 551.0 | 551.0 |
| Volume, gallons | | 50.0 | 50.0 | 50.0 |
| CATALYST/PART B | | | | |
| Hardener | HY-815 Polyamide (7) | 67.1 | 67.1 | 67.1 |
| Solvents | Toluene | 59.1 | 59.1 | 59.1 |
| | Isopropanol | 218.5 | 218.5 | 21.5 |
| Total Part B - weight | | 344.7 | 344.7 | 344.7 |
| Volume, Gallon | | 50.0 | 50.0 | 50.0 |

Raw material suppliers:
(1) Shell Chemical
(2) S.C.M. Chemicals.
(3) Unimin Corporation
(4) Pfizer.
(5) Wayne Pigment Corp.
(6) The Sherwin-Williams Co.
(7) Ciba-Geigy Part A (epoxy base) and Part B (catalyst) were mixed in 1:1 ratio by volume, and inducted for 30 min. before application.

Example 16

This example demonstrates the efficiency of specific guest species, DMTD derivatives, in inorganic coatings in a corrosion inhibitor pigment.

In order to comparatively assess the corrosion inhibitor activity of DMTD derivatives, the Test primer of Example 14, as well as Control A and Control B primer formulations, were applied by wire-wound rod, on several Alodine 1200 (MIL-C-5541) treated bare 2024 T-3 aluminum panels (from The Q-Panel Co.), at 0.6-0.8 mils dry film thickness, aged for 7 days at room temperature, scribed and subsequently subjected to salt spray exposure (according to ASTM B-117) for 2000 hours. Notably, the scribes were applied in the typical cross form, at an approximate width of 2 mm, and, in order to remove the Alodine 1200 conversion coating from the area, at an appropriate depth.

By visual examination of their physical state at the end of the test period, the coatings' corrosion inhibitor performance, considered directly proportional to the tested pigment components' corrosion inhibitive activity was qualified. The scribed area was especially examined and the absence or presence of corrosion products, respectively, was interpreted as display of, or absence of, the respective corrosion inhibitor pigment's "throw power". It will be apparent that the "throw power" is the discriminative characteristic of effective corrosion inhibitor pigments. Test results are summarized in Table 16.

TABLE 16

| Coating/inhibitor Pigment Tested | Qualification of Performance | | "Throw Power" Observed |
|---|---|---|---|
| | Field | Scribe Area | |
| Test primer/Zn $(DMTD)_2$ in a solid matrix(See Referential Example 1) | Intact | Void of corrosion products | yes |
| Control A/$SrCrO_4$ | Intact | Void of corrosion products | yes |
| Control B/$MoO_4^{(2-)}$ based pigment | Intact | Filled with corrosion products | no |

Both Control coatings and the Test coating were found intact in the field at the end of the test period and it was concluded that 2000 hours of salt spray exposure was not sufficiently discriminate. Similarly to $CrO_4^{--}$, DMTD displayed throw power, however, by maintaining the scribe area void of corrosion products, in a passive state for the duration of the salt spray exposure test. In the same conditions, $MoO_4^{--}$ did not show throw power. It was concluded that DMTD derivatives possess effective corrosion inhibitor activity on aluminum and are applicable in pigment grades in organic primers intended for such.

Example 17

The following is an example of applicability of a guest species, DMTD in soluble forms, in conversion coatings for aluminum protection.

A DMTD based conversion coating was applied on several 2024 T-3 aluminum (the Test and Control) panels according to the following protocol: de-greasing, rinsing, deoxidizing (I), rinsing, deoxidizing (II), rinsing, treatment with DMTD (only of the Test panels), drying, post treatment with Zr(IV)/

$K_2ZrF_6$ solution, rinsing and drying. In practice, rinsing (performed in stirred water at ambient temperature for 1 minute) and all operations were carried out by immersion as follows:

The Test and Control panels were de-greased in an alkaline cleaner solution (containing 2% of both $Na_2CO_3$ and $Na_3PO_4$) at 50° C. for 1 minute, followed by rinsing at ambient temperature for 1 minute. Deoxidizing was performed in two phases. Phase (I) was carried out in 25% $H_2SO_4$ solution at 60° C. for 1 minute, followed by rinsing. Phase (II) was performed in 50% $HNO_3$ solution at ambient temperature for 30 seconds, followed by subsequent rinsing. The DMTD based conversion coating was applied (only on the Test panels) by immersion for 10 minutes in saturated DMTD solution at 60° C., under agitation and, without rinsing, by subsequent drying at about 100-110° C. for approximately 10 minutes. Both the Test and the Control panels (the latter without DMTD coating) were post-treated by immersion, for 10 minutes, in a solution containing 0.5% $ZrNO_3$+0.5% $K_2ZrF_6$, at 60° C. under agitation. The treatment was finalized by rinsing and drying the Test and Control panels at 110° C. for 10 minutes.

Example 18

In order to assess the quality of DMTD-based conversion coating on 2024 T-3 aluminum, the Test panels were tested for corrosion resistance (according to ASTM B-117) and paint adhesion (tape test), in comparison with the Control panels, as well as with Alodine 1200 treated 2024 T-3 aluminum panels, the latter being the standard of the industry. The test results are presented below in Table 17.

TABLE 17

| Tested panels | Corrosion resistance Rating* after 336 hours salt spray: | Paint adhesion by tape test: |
| --- | --- | --- |
| Test | 8, some pitting | Pass |
| Control | 0 | Fail |
| Standard | 8, some pitting | Pass |

*rating is considered on the 0 (extensive corrosion) to 10 (no corrosion) numeric scale.

As the presented data indicates, DMTD-based conversion coating on 2024 T-3 Aluminum, applied according to the present invention, possesses robust resistance to corrosion and good paint adhesion, similar to chromate-based Alodine 1200 conversion coatings.

It was concluded that the treated DMTD derivatives are applicable as corrosion inhibitors in conversion coating technologies intended for aluminum protection.

Example 19

This example demonstrates the applicability of di-mercapto and tri-thio derivatives according to the present invention, as corrosion inhibitor additives in paint formulations. Specifically, the application of trithiocyanuric acid-di-cyclohexylamine, in a salt of a 1:1 ratio, as an additive in a typical coil primer formulation, is disclosed.

The coil primer formulation prepared was identical to the test formulation described in Referential Example 4 (See Table D), except that the corrosion inhibitor constituent consisted of 120 parts by weight Sr-doped amorphous silica, prepared according to Example 13, and 30 parts by weight of trithiocyanuric acid-di-cyclohexylamine, in a salt of a 1:1 ratio. This was introduced into the formulation to end up with 1006.8 parts by weight of paint and ground to 6.5-7.0 fineness on the Hegman. The trithiocyanuric acid-di-cyclohexylamine 1:1 salt was synthesized according to Referential Example 5 of the present invention.

Consequently, the corrosion inhibitor constituent of the test formulation according to Example 19 consists of an ordinary physical mixture of the above two components. The results are shown in Table 18 (See Example 20).

Example 20

This examples demonstrates the efficiency of di-mercapto, derivatives, in general, and of trithiocyanuric acid and its derivatives, in particular, as corrosion inhibitor pigments or additives in coil primer formulations and on typical coil substrates, such as galvanized steel. It will be, however, apparent to one skilled in the art that the concept of the present invention applies for primers intended for steel protection in general.

In order to comparatively assess the corrosion inhibitor activity of trithiocyanuric acid and its derivatives, the test primers of Referential Example 4 & Example 19, along with control formulations A & B from Referential Example 4, were applied by wire-wound rod, on several galvanized steel panels (from L.T.V. Steel Co.), at 0.6-0.7 mil dry film thickness, aged for at least 2 (two) days at room temperature, scribed and subsequently subjected to salt spray exposure (according to ASTM B-117).

The scribes were applied in the typical cross form, and, in order to cut through the protective galvanic zinc coating from the area of the scribes, at appropriate depth. During salt spray exposure, the coatings' physical state was assessed periodically by visual examination. Scribe areas were observed for the absence or presence of corrosion products (white rust), and "field" areas were observed for the physical integrity of coatings and the presence of white rust.

Notably, the protective performance of the tested coatings was qualified by the service life of coatings, defined as the total hours of salt spray exposure that result in extensive corrosion along the scribes and considerable corrosion in the "field" areas. Service life of a coating is considered directly proportional to the related pigments' or additives' corrosion inhibitor performance, which is conveniently qualified by $E_i$, the Inhibitor Efficiency Index, defined as:

$$E_i = 100[(\text{service life})_{TEST} - (\text{service life})_{CONTROL}]/(\text{service life})_{CONTROL}.$$

It is important to note, that the service life of control formulation A from Referential Example 4, containing $SrCrO_4$ as a corrosion inhibitor pigment, was considered as the test control, or (service life)$_{CONTROL}$.

It will be apparent, that values of $E_i$>0 indicate comparatively better corrosion inhibitor performance than the control's ($SrCrO_4$'s) performance, whereas values of $E_i$<0 indicate a poorer corrosion inhibitor performance than that of the control. The test results are summarized below in table 18.

TABLE 18

| Test | Inhibitor Pigment or additive/coating | Service life of Coating (hours) | $E_i$ % |
| --- | --- | --- | --- |
| 1. | Trithiocyanuric acid-di-cyclohexylamine, 1:1 salt and Sr-doped amorphous silica mixture, as described by the test primer in Example 19. | 3000 | 87 |

TABLE 18-continued

| Test | Inhibitor Pigment or additive/coating | Service life of Coating (hours) | $E_i$% |
|---|---|---|---|
| 2. | Trithiocyanuric acid + Sr-doped amorphous silica pigment grade mixture, as described by the test primer in table D (Ref. Ex. 4). | 2000 | 25 |
| 3. | SrCrO$_4$, as described by control A in table D (Ref. Ex. 4) | 1600 | 0 |
| 4. | Sr-doped amorphous silica, as described by control A in table D (Ref. Ex. 4). | 1000 | −37 |

The disclosed $E_i$ values indicate that, in comparison with Sr-doped amorphous silica, trithiocyanuric acid and trithiocyanuric acid-di-cyclohexylamine, 1:1 salt significantly extend the service life of the coatings. Trithiocyanuric acid extends the service life of coil coatings on galvanized steel by 100% over Sr-doped amorphous silica, and trithiocyanuric acid-di-cyclohexylamine, 1:1 salt, extends the service life by 200% over Sr-doped amorphous silica. Likewise, both compounds displayed considerably better corrosion inhibitor performance than SrCrO$_4$, and more specifically trithiocyanuric acid-di-cyclohexylamine, 1:1 salt displayed the best corrosion inhibiting performance. Also, Sr-doped amorphous silica, as expected, displayed significantly poorer inhibitor performance than SrCrO$_4$.

Example 21

This example is intended to demonstrate one possible application of a pigment grade Htlc-DMTD derivative, specifically in a typical coil coating paint formulation.

The pigment grade Htlc-DMTD derivative (at 22% DMTD content) was synthesized according to the process described in Example 4, and the derivative was formulated into a solvent-borne, polyester-based coil formulation as described in Referential Example 4. (See Control Formulation A, in Table D). In this formulation, 143.5 g of pigment grade SrCrO$_4$ was replaced with 92.0 g of Htlc-DMTD. The resultant polyester-based coil formulation was applied by wire-wound rod, on galvanized steel panels (from L.T.V. Steel Co.), at 0.6-0.7 mil dry film thickness, aged for at least 2 (two) days at room temperature, scribed and subsequently subjected to protective performance test.

Example 22

This example is intended to demonstrate the application of a pigment grade Htlc-DMTD derivative in a typical solvent-borne, two-component aircraft primer formulation specifically recommended for aluminum protection.

The pigment grade Htlc-DMTD derivative (at 10% DMTD content) was synthesized according to the process described in Example 3 and was formulated into the aircraft primer formulation presented in Example 15 (see Control Primer A in Table 15).

In this formulation, 107.5 g of pigment grade SrCrO$_4$ was replaced with 69.0 g of Htlc-DMTD. The resulted aircraft primer was applied by wire-wound rod, on Alodine 1200 (MIL-C-5541) treated bare 2024 T-3 aluminum panels (from The Q-Panel Co.), at 0.6-0.8 mils dry film thickness, aged for 7 days at room temperature, scribed and subsequently subjected to protective performance test.

Example 23

This example is intended to demonstrate the usefulness, as corrosion inhibitor pigments, of double hydroxides with layered structure of $[M(II)_{1-x}M(III)_x(OH^-)_2]$ $[A^{n-}_{x/n} \cdot y\ H_2O]$ general composition and anion-exchanged with selected anionic species. More specifically, this example demonstrates the effectiveness of the Htlc-DMTD host-guest composition (for example as synthesized according to Example 4) as pigment grade inhibitors of the atmospheric corrosion of Al 2024.

The inhibitor performance test on the pigment grade Htlc-DMTD derivative was carried out according to the procedure developed by M. Kendig and M. Hon at the Rockwell Scientific Company (see patent application Ser. No. 10/690,787, "Apparatus for the Rapid Evaluation of Corrosion Inhibiting Activity of Paint and Coatings").

This procedure essentially measures the rate of the cathodic oxygen reduction reaction (as related and directly proportional cathodic current in the absence ($I_{no\ inh}$) and, respectively, in the presence ($I_{inh}$) of dissolved corrosion inhibitor species, and specifically in the present example, on an immersed Cu rotating disk cathode. It will be apparent that the Cu cathode, in this example, models the cathodically polarized Cu-rich intermetallics sites on Cu-rich Al alloy surfaces and allows the assessment of inhibitors dissolved, dispersed or leached into (from coatings) the aqueous immersion phase, with latter typically being a neutral 5% NaCl solution.

The effectiveness of inhibitors is quantified by the Inhibitor Strength=$I_{no\ inh}/I_{inh}$ or by R, the Reversibility Factor=$I_r/I_{no\ inh}$, where $I_r$ is measured in the absence of an inhibitor on an electrode previously exposed to inhibitor solution.

It will be apparent that high Inhibitor Strength and low Reversibility Factor values indicate high inhibitor efficiency and vice versa.

The experimental results on Htlc-CO$_3$ (control), Htlc-DMTD at 13% load and at 20% load (with the latter being synthesized according to the process stated in Example 4), all dispersed in 5% neutral NaCl, as well as on $CrO_4^{(2-)}$ (standard) dissolved at 10 mM concentration and pH=6, are presented below in Table 19.

TABLE 19

| Inhibitor | Inhibitor Strength | Reversibility Factor, % |
|---|---|---|
| Htlc-CO$_3$ | 1.2 | 93 |
| $CrO_4^{(2-)}$, 10 mM, pH = 6 | 62.5 | 27 |
| Htlc-DMTD, 13% load | 74.2 | 3 |
| Htlc-DMTD, 20% load (Example 4) | 94.1 | 2 |

The presented experimental data indicates that the Htlc-DMTD derivatives function as a reservoir of inhibitor species, it operates by releasing DMTD guest species into aqueous medium by an anion exchange mechanism. Notably, the inhibitor efficiency of Htlc-DMTD derivative appears to be directly proportional to the load of the DMTD guest species. Also, the experimental data constitute compelling evidence on the efficiency and the corrosion inhibitor mechanism of DMTD on Cu rich Aluminum alloys, that is, on the inhibition by DMTD of the O$_2$ reduction process which takes place on discrete Cu rich intermetallics sites such as typical for Al 2024.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

We claim:

1. A pigment grade corrosion inhibitor for a metal substrate against atmospheric corrosion, said inhibitor comprising: a host guest-compound, said host guest compound comprising: host compound comprised of a hydrotalcite compound; and a guest compound, said guest compound comprises a weak acid selected from the group consisting: DMTD and derivatives of DMTD.

2. The corrosion inhibitor according to claim 1, wherein said host compound comprises a double hydroxide compound having a structure of:

$$[M(II)_{1-x} M(III)_x (OH^-)_2][A^{n-}{}_{x/n} \cdot y\, H_2O],$$

wherein M(II) is a monovalent or divalent metal cationic species, M(III) is a trivalent metal cationic species, and $A^{n-}$ is said anionic species.

3. The corrosion inhibitor according to claim 2, wherein said divalent or monovalent metallic cationic species is selected from the group consisting of:

Mg(II), Cu(II), Ni(II), Co(ID, Zn(II), Fe(II), Mn(II), Cd(II), Pb(II), Ca(II), Sr(II), Li(I), and various combinations of all of the above; and said trivalent metallic cationic species is selected from the group consisting of:

Al(III), Ga(III), Ni(III), Co(III), Fe(III), Mn(III), Cr(III), V(III), Ti, In, Ce(III), La(III), or combinations of all of the above.

4. The corrosion inhibitor according to claim 3, wherein said guest compound is further selected from the group consisting of:

mono- and di-alkyl or aryl- esters of ortho-phosphoric and pyro-phosphoric acid; derivatives of phosphonic acid; alkyl and aryl esters of thio-phosphoric and dithio-phosphoric acid; molybdic, phospho-molybdic, silico-molybdic acid; boric acid; cyanamidic acid; nitrous acid; derivatives of thio- and dithiocarbonic acid, said derivative of thio- and dithiocarbonic acid including o-alkyl esters; derivatives of dithiocarbamic acid, including N-alkyl dithiocarbamates; pyrrolidinecarbodithioic acid; thio-organic compounds functionalized with at least one —SH group of acidic character, said thio-organic compounds including:

2,5-dimercapto-1,3,4-thiadiazole (DMTD), 2,4-dimercapto-s-triazolo-[4,3-b]-1,3-4 thiadiazole, trithiocyanuric acid (TMT), and dithiocyanuric acid, various N—,S— and N,N—, S,S— and N,S— substituted derivatives of the above DMTD and TMT compounds; various S-substituted derivatives of tritbiocyanuric acid; dimer and polymer derivatives of the above DMTD and TMT compounds, including 5,5' dithio-bis (1,3,4 thiadiazole-2(3H)-thione or $(DMTD)_2$, and $(DMTD)_n$, polymers of DMTD and $(TMT)_2$, dimers and polymers of TMT; various combinations of all the above;

soluble salts of DMTD and TMT;

poly-ammonium salt of DMTD or $(DMTD)_n$ and TMT formed with polyamines;

mercapto-benzothiazole, mercapto-benzoxazole, mercapto-benzimidazole, and combinations, thereof;

di- and poly-mercapto compounds, including:

di-mercapto derivatives of thiophene, pyrrole, furane, diazoles, and thiadiazoles; di- and tri-mercapto derivatives of pyridine, diazines, triazines, benzimidazole, and benzothiazole, including dimercaptopyridine, 2,4-dithiohydantoine, and 2,4,-dimercapto-6-amino-5-triazine; and carboxylic and di-carboxylic acids, including ascorbic, salicylic acid, phthalic acid, nitro-phthalic acid, succinic acid, and derivatives of succinic acid, including 1-(benzothiazol-2-yltbio)succinic acid.

5. The corrosion inhibitor according to claim 2, wherein the host compound comprises at least one metallic cation selected from the group consisting of: Mg, Ca, Sr, La, Ce, Zn, Fe, Al, Bi, and various combinations of all of the above.

6. The corrosion inhibitor according to claim 5, wherein the guest compound comprises at least one anion selected from the group consisting of: $MoO_4^{--}$, $PO_4^{---}$, $HPO_3^{---}$, polyphosphates, $BO_2^-$, $SiO_4^{--}$, $NCN^-$, $WO_3^{--}$, and various combinations of all of the above.

* * * * *